(12) United States Patent
Zhao et al.

(10) Patent No.: US 12,425,598 B2
(45) Date of Patent: Sep. 23, 2025

(54) CROSS COMPONENT SAMPLE OFFSET FILTERING WITH ASYMMETRIC QUANTIZER

(71) Applicant: TENCENT AMERICA LLC, Palo Alto, CA (US)

(72) Inventors: Xin Zhao, San Jose, CA (US); Liang Zhao, Sunnyvale, CA (US); Jing Ye, San Jose, CA (US); Han Gao, San Diego, CA (US); Yushin Cho, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 67 days.

(21) Appl. No.: 18/497,662

(22) Filed: Oct. 30, 2023

(65) Prior Publication Data
US 2025/0047856 A1    Feb. 6, 2025

Related U.S. Application Data

(60) Provisional application No. 63/530,571, filed on Aug. 3, 2023.

(51) Int. Cl.
*H04N 19/132* (2014.01)
*H04N 19/124* (2014.01)
(Continued)

(52) U.S. Cl.
CPC ......... *H04N 19/132* (2014.11); *H04N 19/124* (2014.11); *H04N 19/172* (2014.11); *H04N 19/186* (2014.11); *H04N 19/70* (2014.11)

(58) Field of Classification Search
CPC .. H04N 19/132; H04N 19/124; H04N 19/172; H04N 19/186; H04N 19/70
See application file for complete search history.

(56) References Cited

U.S. PATENT DOCUMENTS 5,172,237 A * 12/1992 Blonstein ........... H04N 1/40056
                                                                                382/166
6,327,304 B1 * 12/2001 Miller ................... H04N 11/046
                                                                                375/240.12
(Continued)

FOREIGN PATENT DOCUMENTS

CN        104702963 B    11/2017
WO    WO 2015/163046 A1    10/2015
(Continued)

OTHER PUBLICATIONS

International Search Report and Written Opinion of PCT application PCT/US23/36489, dated Feb. 14, 2024, 9 pages.
(Continued)

*Primary Examiner* — Fabio S Lima
(74) *Attorney, Agent, or Firm* — Crowell & Moring LLP

(57) ABSTRACT

This disclosure describes aspects of advanced video coding technologies and is particular related to cross-component sample offset (CCSO) filtering of reconstructed samples. For example, a quantizer for quantizing sample deltas in order to apply a CCSO filter may be constructed as an asymmetric quantizer with respect to zero sample delta. Either a symmetric or an asymmetric quantizer may be selected for processing sample deltas prior to applying a CCSO filter. An asymmetric quantizer may relate to a corresponding symmetric quantizer by a non-zero offset. Signaling of a selection of an asymmetric quantizer may be provided separately from or dependent on a signaling of a symmetric quantizer.

20 Claims, 15 Drawing Sheets

(51) Int. Cl.
  *H04N 19/172* (2014.01)
  *H04N 19/186* (2014.01)
  *H04N 19/70* (2014.01)

(56) References Cited

U.S. PATENT DOCUMENTS

| | | | |
|---|---|---|---|
| 11,595,644 | B2 | 2/2023 | Du et al. |
| 11,683,530 | B2 | 6/2023 | Du et al. |
| 2013/0336383 | A1 | 12/2013 | Xu |
| 2017/0127078 | A1 | 5/2017 | Kobayashi |
| 2019/0045186 | A1 | 2/2019 | Zhang et al. |
| 2019/0052877 | A1 | 2/2019 | Zhang |
| 2019/0182482 | A1 | 6/2019 | Vanam et al. |
| 2021/0051320 | A1 | 2/2021 | Tourapis |
| 2022/0038726 | A1 | 2/2022 | Kuo et al. |
| 2022/0101095 | A1 | 3/2022 | Li |
| 2022/0109848 | A1 | 4/2022 | Wang |
| 2022/0150517 | A1 | 5/2022 | Du et al. |
| 2022/0248007 | A1 | 8/2022 | Misra |
| 2022/0272335 | A1 | 8/2022 | Liu |
| 2022/0272347 | A1 | 8/2022 | Zhu |
| 2022/0272348 | A1 | 8/2022 | Zhang |
| 2022/0279176 | A1 | 9/2022 | Sarwer |
| 2022/0286674 | A1 | 9/2022 | Wang |
| 2022/0295054 | A1 | 9/2022 | Zhao |
| 2022/0303586 | A1 | 9/2022 | Du |
| 2022/0321919 | A1 | 10/2022 | Deshpande |
| 2022/0337853 | A1 | 10/2022 | Li |
| 2023/0143147 | A1* | 5/2023 | Du ........................ H04N 19/70 375/240.26 |

FOREIGN PATENT DOCUMENTS

| | | | |
|---|---|---|---|
| WO | WO 2020/259538 | A | 12/2020 |
| WO | WO 2022/040428 | A1 | 2/2022 |

OTHER PUBLICATIONS

Office Action issued on European Application 22760638.1 on Jun. 9, 2023, 16p.

Bross, Benjamin et al., "Working Draft 5 of Versatile Video Coding", JVET, International Organization for Standardization, ISO/IEC JTC 1/SC29/WG11 N18370, Coding of Moving Pictures and Audio, Mar. 2019, 406p, CH.

Bhat, Madhukar et al., "AHG10: Adaptive Coding Sub-set for encoder optimization", Input Document to JVET of ITU-T SG 16 WP 3 and ISO/IEC JTC 1/SC 29/WG 11, 15th Meeting, Jul. 3-12, 2019, 7p, SE.

Bross, B. et al.; "Versatile Video Coding (Draft 6)"; Document: JVET-O2001-vE; Joint Video Experts Team (JVET) of ITU-T SG 16 WP 3 and ISO/IEC JTC 1/SC 29/WG11, 15th Meeting: Gothenburg, SE, Jul. 3-12, 2019; 460 pages.

Bross, B. et al.; "Versatile Video Coding (Draft 7)"; Document: JVET-P2001-vE; Joint Video Experts Team (JVET) of ITU-T SG 16 WP 3 and ISO/IEC JTC 1/SC 29/WG 11, 16th Meeting: Geneva, CH, Oct. 1-11, 2019; 485 pages.

Bross, B. et al.; "Versatile Video Coding (Draft 8)"; Document: JVET-Q2001-vE; Joint Video Experts Team (JVET) of ITU-T SG 16 WP 3 and ISO/IEC JTC 1/SC 29/WG 11, 17th Meeting: Brussels, BE, Jan. 7-17, 2020; 510 pages.

Chen, Y. et al.; "An Overview of Core Coding Tools in the AV1 Video Codec"; In2018 picture coding symposium (PCS); Alliance for Open Media; Jun. 24, 2018; 5 pages.

Daede, T.J. et al.; "Daala: A Perceptually-Driven Next Generation Video Codec"; arXiv preprint arXiv: 1603.03129; Mar. 10, 2016; 10 pages.

de Rivaz, P. et al.; "AV1 Bitstream & Decoding Process Specification"; Version 1.0.0 eith Errata 1; The Alliance for Open Media; Jan. 8, 2019; 681 pages.

Du, Y. et al.; "Cross-Component Sample Offset for Image and Video Coding"; 2021 International Conference on Visual Communications and Image Processing (VCIP); IEEE; Dec. 5, 2021; 5 pages.

Midtskogen, S. et al.; "The AV1 Constrained Directional Enhancement Filter (CDEF)"; In2018 IEEE International Conference on Acoustics, Speech and Signal Processing (ICASSP); IEEE; Apr. 15, 2018; 5 pages.

Midtskogen, S. et al.; "Integrating Thor Tools into the Emerging AV1 Codec"; IEEE International Conference on Image Processing (ICIP); Sep. 17, 2017; pp. 930-933.

Misra, K. et al.; "Cross-Component Adaptive Loop Filter for Chroma"; Document: JVET-O0636_r1; Joint Video Experts Team (JVET) of ITU-T SG 16 WP 3 and ISO/IEC JTC 1/SC 29/WG 11, 15th Meeting: Gothenburg, SE, Jul. 3-12, 2019; 9 pages.

Misra, K. et al.; "CE5-related: On the design of CC-ALF"; Document: JVET-P1008-v2; Joint Video Experts Team (JVET) of ITU-T SG 16 WP 3 and ISO/IEC JTC 1/SC 29/WG 11, 16th Meeting: Geneva, CH, Oct. 1-11, 2019; 6 pages.

Mukherjee, D. et al.; "A Switchable Loop-Restoration with Side-Information Framework for the Emerging AV1 Video Codec"; In2017 IEEE International Conference on Image Processing (ICIP); IEEE; Sep. 17, 2017; pp. 265-269.

Taquet, J. et al.; "CE5: Results of Tests CE5-3.1 to CE5-3.4 on Non-Linear Adaptive Loop Filter"; Document: JVET-N0242; Joint Video Experts Team (JVET) of ITU-T SG 16 WP 3 and ISO/IEC JTC 1/SC 29/WG 11, 14th Meeting: Geneva, CH, Mar. 19-27, 2019; 10 pages.

Tsai, C.-Y. et al.; "TE10 Subtest2: Coding Unit Synchronous Picture Quadtree-based Adaptive Loop Filter"; Document: JCTVC-C143; Joint Collaborative Team on Video Coding (JCT-VC) of ITU-T SG 16 WP3 and ISO/IEC JTC1/SC 29/WG11, 3rd Meeting: Guangzhou, CN, Oct. 7-15, 2010; 12 pages.

Zhao, X. et al.; "CWG-B099: Improved CCSO with luma extension and band feature"; Jan. 11, 2022; 5 pages.

International Search Report mailed May 3, 2022 for International Application No. PCT/US2022/014255.

Written Opinion mailed May 3, 2022 for International Application No. PCT/US2022/014255.

\* cited by examiner

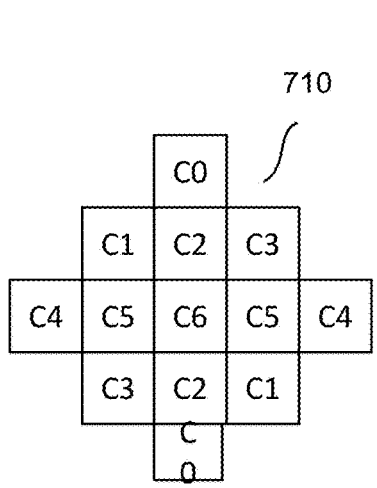
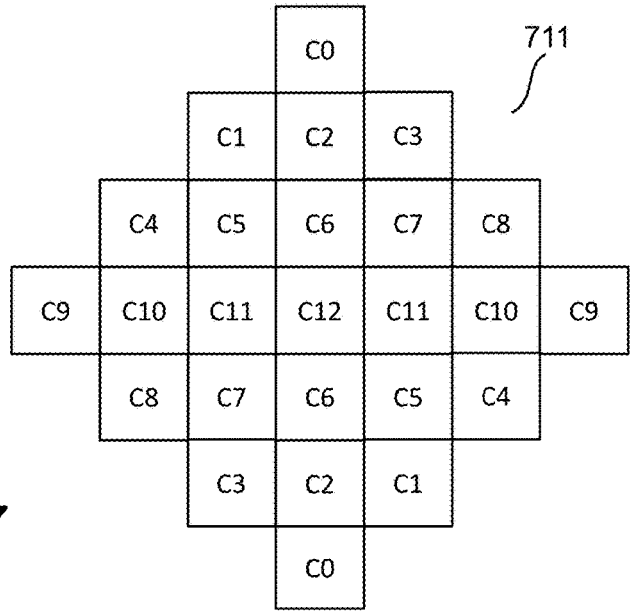
FIG. 7
FIG. 8A
FIG. 8B
FIG. 8C
FIG. 8D

FIG. 10A
FIG. 10B
FIG. 10C
FIG. 10D
FIG. 10E
FIG. 10F

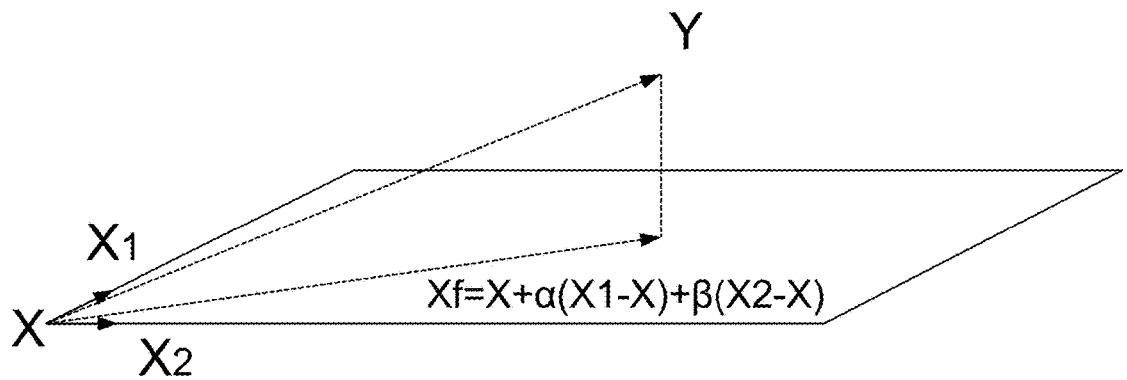
FIG. 17
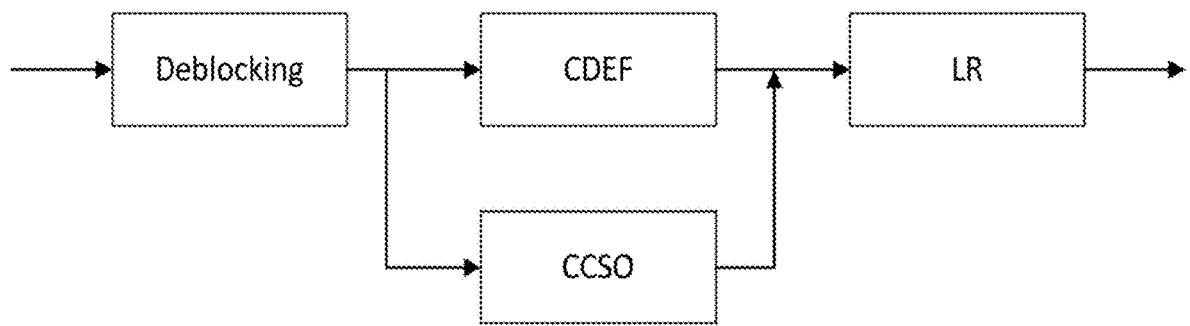
FIG. 18
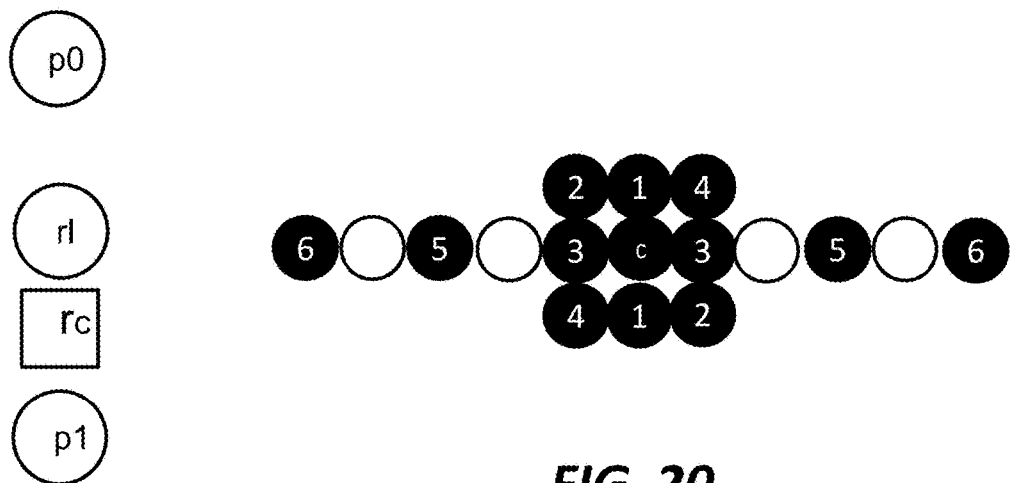
FIG. 19
FIG. 20

CROSS COMPONENT SAMPLE OFFSET FILTERING WITH ASYMMETRIC QUANTIZER

INCORPORATION BY REFERENCE

This disclosure is based on and claims the benefit of priority to U.S. Provisional Application No. 63/530,571, entitled "CROSS COMPONENT SAMPLE OFFSET FILTERING WITH ASYMMETRIC QUANTIZER," filed on Aug. 3, 2023, which is herein incorporated by reference in its entirety.

TECHNICAL FIELD

This disclosure generally describes a set of advanced video coding technologies, and is specifically related to cross-component sample offset filtering.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure describes aspects of advanced video coding technologies and is particular related to cross-component sample offset (CCSO) filtering of reconstructed samples. For example, a quantizer for quantizing sample deltas in order to apply a CCSO filter may be constructed as an asymmetric quantizer with respect to zero sample delta. Either a symmetric or an asymmetric quantizer may be selected for processing sample deltas prior to applying a CCSO filter. An asymmetric quantizer may relate to a corresponding symmetric quantizer by a non-zero offset. Signaling of a selection of an asymmetric quantizer may be provided separately from or dependent on a signaling of a symmetric quantizer.

In some example implementations, a method for video filtering is disclosed. The method may include reconstructing a frame from a video bitstream to generate reconstructed samples of at least a first color component and a second color component of the frame; obtaining, based on a first syntax element signaled in the video bitstream, a quantizer among a plurality of quantizers for quantization of a CCSO filtering unit of the frame, the plurality of quantizers comprising at least one asymmetric quantizer being asymmetric with respect to values being quantized on a positive and negative side of zero value; selecting the quantizer indicated by the first syntax element; applying the selected quantizer to CCSO sample deltas of the reconstructed samples of the first color component of the CCSO filtering unit according to a CCSO filter to generate quantized CCSO sample deltas; determining CCSO sample offsets according to the quantized CCSO sample deltas and the CCSO filter; and applying the CCSO sample offsets to the reconstructed samples of the second color component in the CCSO filtering unit to generate filtered samples of the second color component in the CCSO filtering unit.

In the example implementations above, each of the plurality of quantizers is characterized by one or more quantization intervals.

In any one of the example implementations above, the at least one asymmetric quantizer each correspond to one of symmetric quantizers of the plurality of quantizers, by a CCSO sample delta offset, each of the symmetric quantizers being symmetric with respect to zero sample delta.

In any one of the example implementations above, the plurality of quantizers are predefined and indexed, and the selected quantizer is signaled in the video bitstream by the first syntax element.

In any one of the example implementations above, the plurality of quantizers comprises a subset of symmetric quantizers and a subset of asymmetric quantizers having a one-to-one correspondence relationship.

In any one of the example implementations above, the subset of symmetric quantizers and the subset of asymmetric quantizers are related by a predefined sample delta offset.

In any one of the example implementations above, a selection of an asymmetric quantizer is indicated in the video bitstream by a second syntax element for signaling an indication that an asymmetric quantizer is to be used and by the first syntax element indicating a symmetric quantizer among the subset of symmetric quantizers that correspond to the selected asymmetric quantizer.

In any one of the example implementations above, the first syntax element comprises an index for the symmetric quantizer corresponding to the selected asymmetric quantizer.

In any one of the example implementations above, the plurality of quantizers comprises a subset of symmetric quantizers and a subset of asymmetric CCSO quantizers with unequal numbers.

In any one of the example implementations above, each of the subset of symmetric quantizers corresponds to zero or more asymmetric quantizers by one or more sample delta offsets among a predefined set of sample delta offsets.

In any one of the example implementations above, a selection of an asymmetric quantizer is indicated in the video bitstream by the first syntax element indicating a symmetric quantizer corresponding to the selected asymmetric quantizer and a second syntax element indicating an offset to apply the symmetric quantizer indicated by the first syntax element to generate the selected asymmetric quantizer.

In any one of the example implementations above, a selection of an asymmetric quantizer is indicated in the video bitstream by the first syntax element indicating a symmetric quantizer corresponding to the selected asymmetric quantizer and a second syntax element indicating an index among asymmetric quantizers corresponding to the symmetric quantizer indicated by the first syntax element.

In any one of the example implementations above, a number of asymmetric quantizers corresponding to a symmetric quantizer depends non-descendingly on a size of a quantization interval of the symmetric quantizer.

In any one of the example implementations above, at least one of the subset of symmetric quantizers corresponds to none of the subset of asymmetric quantizers.

In any one of the example implementations above, a symmetric quantizer among the subset of symmetric quantizers corresponds to none of the subset of asymmetric quantizers when its deadzone is at or smaller than a threshold value, a deadzone representing a quantization interval encompassing zero sample delta of a symmetric quantizer.

In any one of the example implementations above, the first syntax element is signaled at a sequence header, a picture header, a tile header, or a largest coding block header level.

In any one of the example implementations above, the first syntax element is used to select an asymmetric quantizer from the plurality of quantizers by indicating a symmetric quantizer, deriving a sample delta offset based on the indicated symmetric quantizer, and generating the selected asymmetric quantizer by applying the derived sample delta offset to the indicated symmetric quantizer.

In any one of the example implementations above, deriving the sample delta offset is based on a size of a deadzone of the indicated symmetric quantizer, the deadzone representing a quantization interval encompassing zero sample delta of the indicated symmetric quantizer.

In any one of the example implementations above, determining the selected quantizer according to the first syntax element may include determining from the first syntax element a selected symmetric quantizer; determining a size of a deadzone of the selected symmetric quantizer, the deadzone representing a quantization interval encompassing zero sample delta of the selected symmetric quantizer; in response to the size of the deadzone of the selected symmetric quantizer being smaller than a predefined threshold value, determining that the selected symmetric quantizer is to be applied; and in response to the size of the deadzone of the selected symmetric quantizer being no smaller than the predefined threshold value, determining whether an asymmetric quantizer is to be selected based on a second syntax element in the video bitstream.

In some implementations, a video encoding or decoding device is disclosed. The device may include circuitry configured to implement any of the methods above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 7 shows exemplary adaptive loop filters according to embodiments of the disclosure.

FIGS. 8A-8D show examples of subsampled positions used for calculating gradients of a vertical direction, a horizontal direction, and two diagonal directions, respectively, according to embodiments of the disclosure.

FIGS. 10A-10F show exemplary adaptive loop filters with padding operations at respective virtual boundaries according to embodiments of the disclosure.

FIG. 17 shows an example of a subspace projection according to an embodiment of the disclosure.

FIG. 18 shows an example location of a Cross-Component Sample Offset CCSO filtering in a loop filter pipeline.

FIG. 19 shows an example of a filter support area in a CCSO filter according to an embodiment of the disclosure.

FIG. 20 shows an example implementation of 3-tap CCSO filter shapes according to an embodiment of the disclosure.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
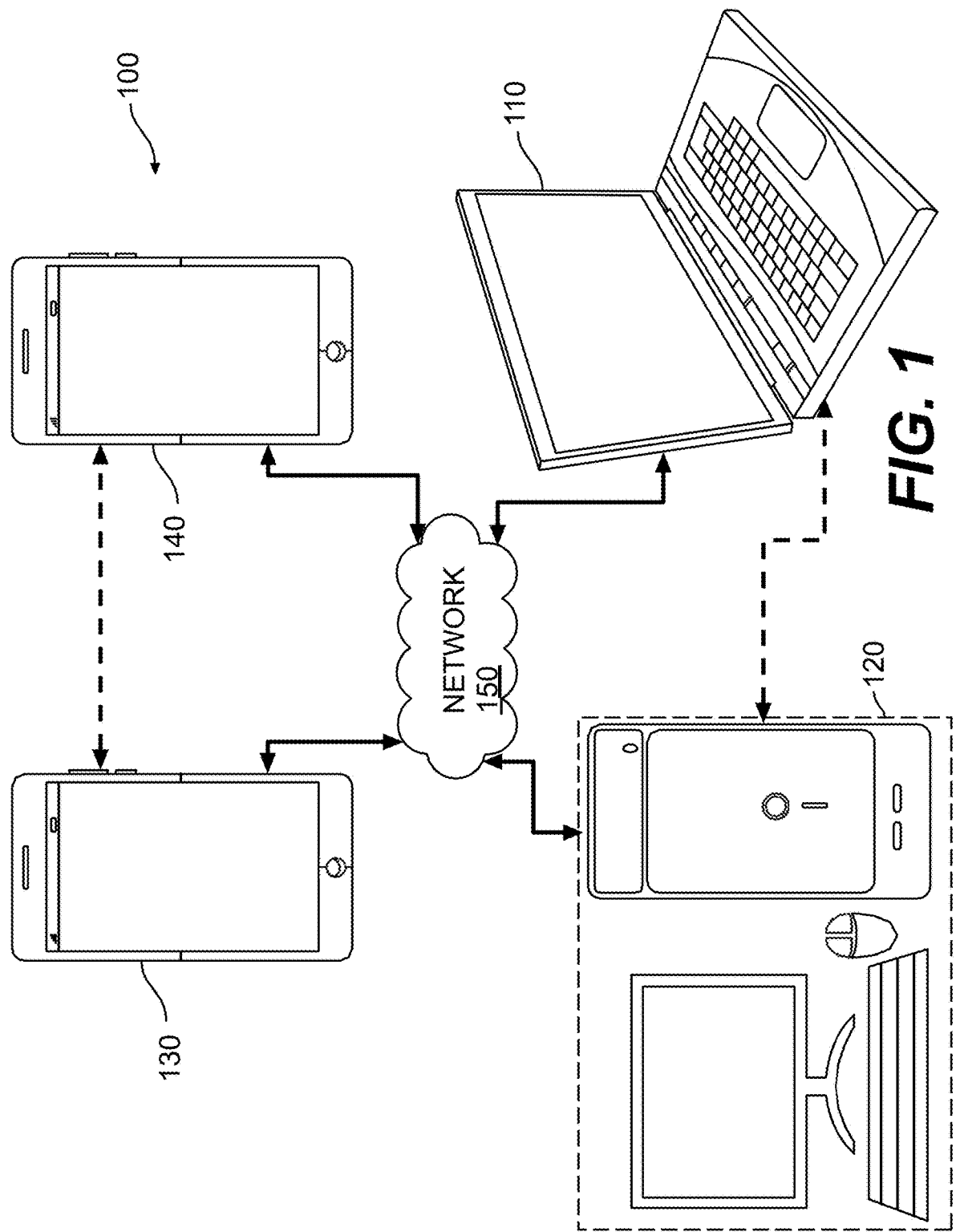
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100)

includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
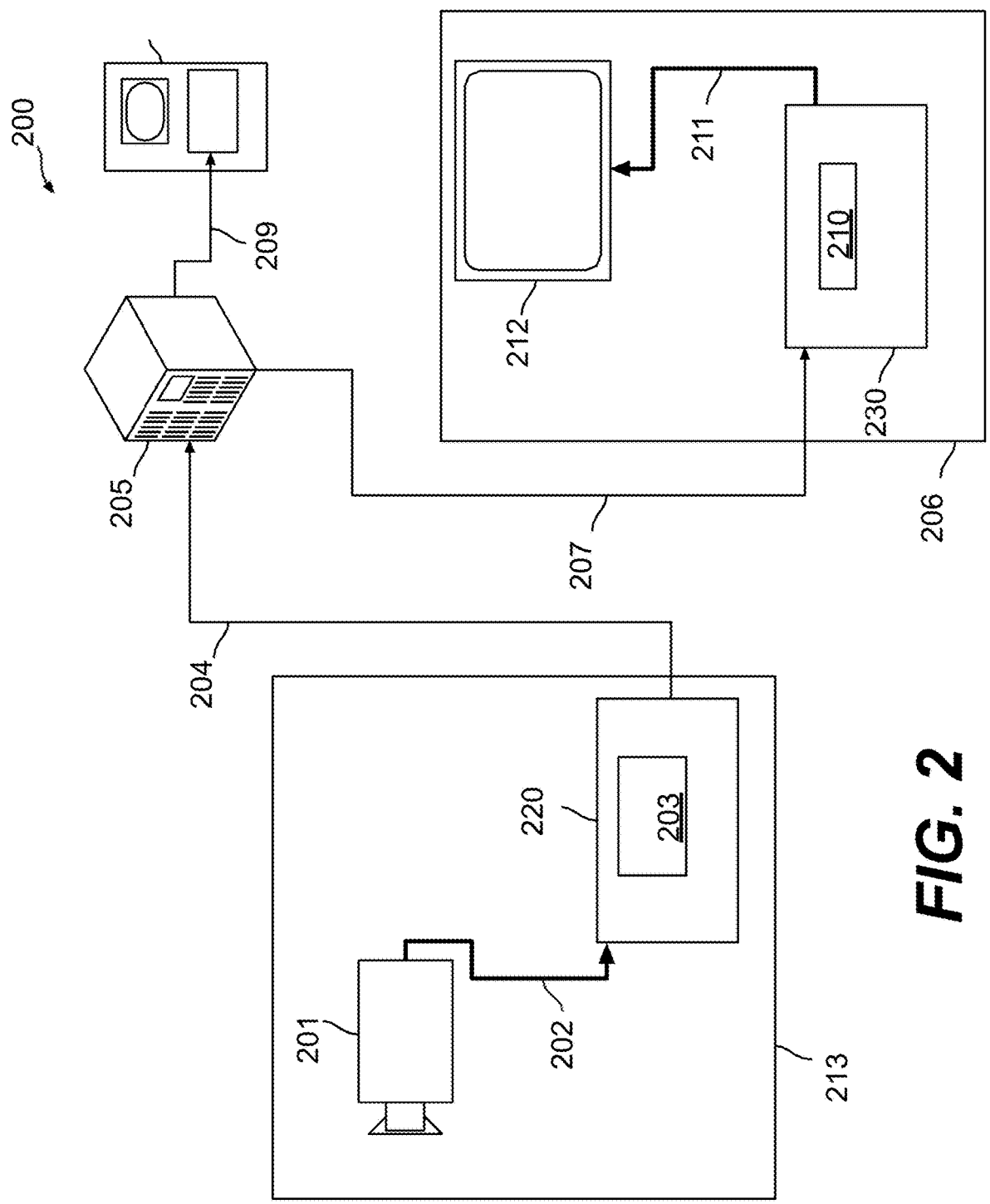
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
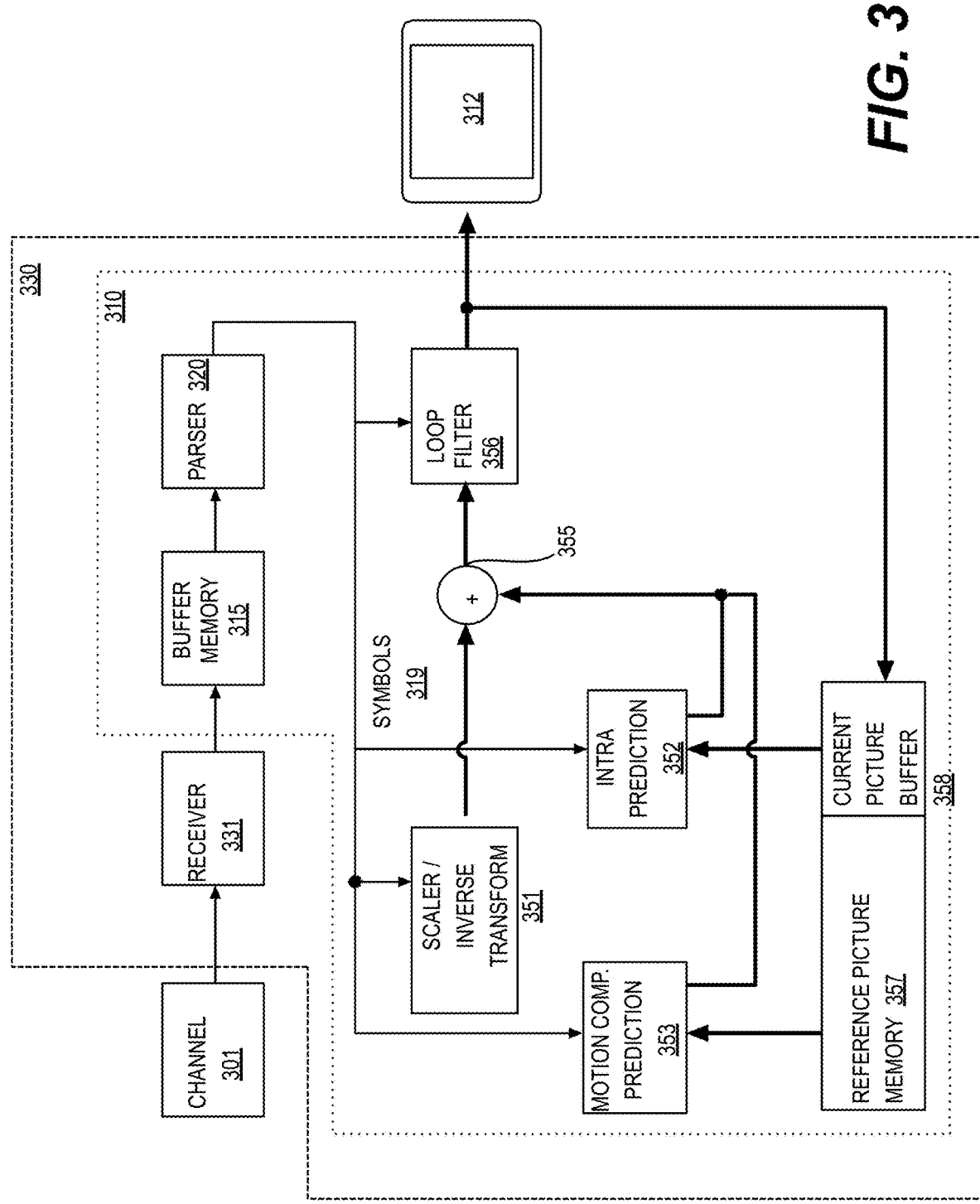
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
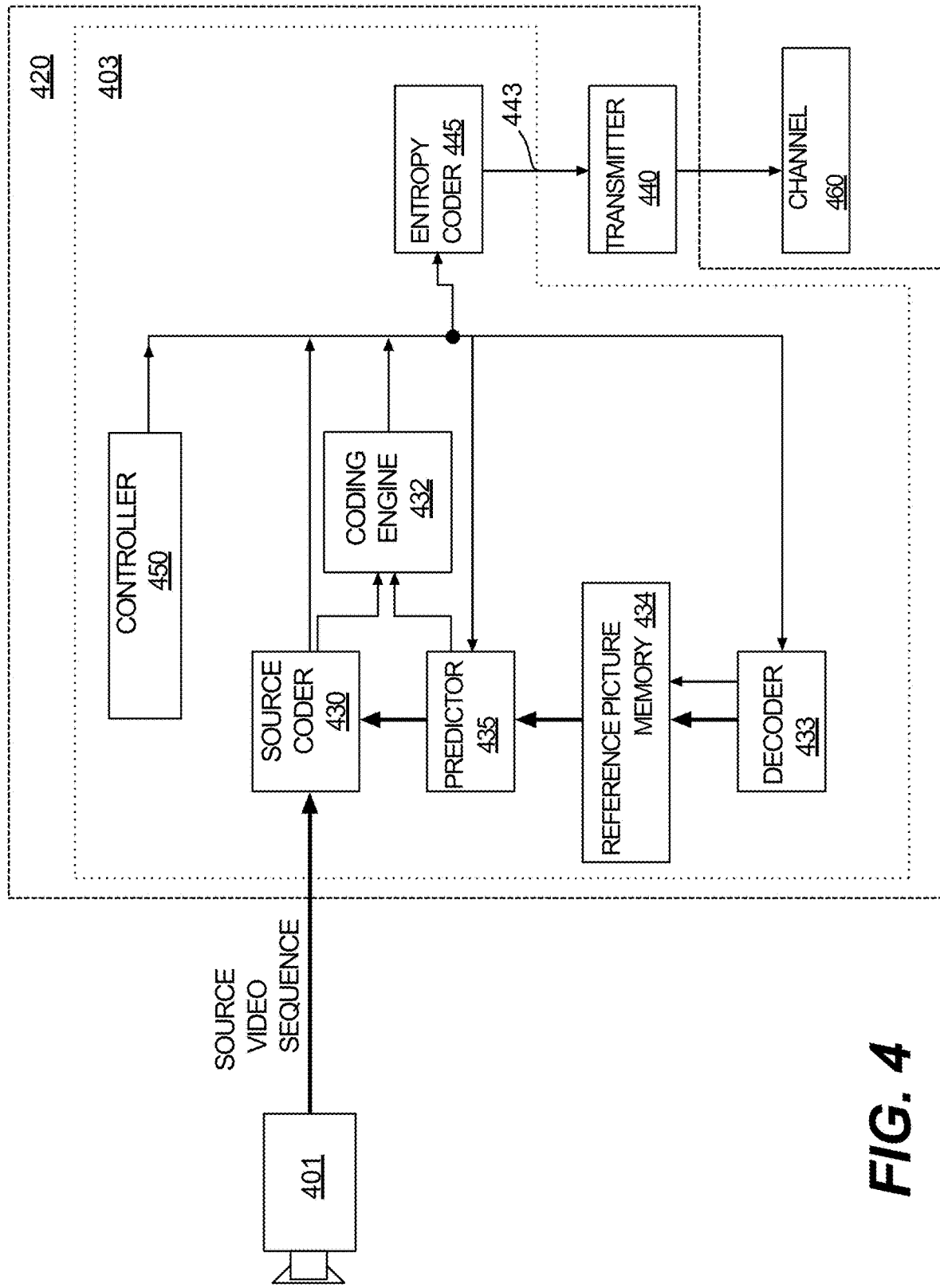
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
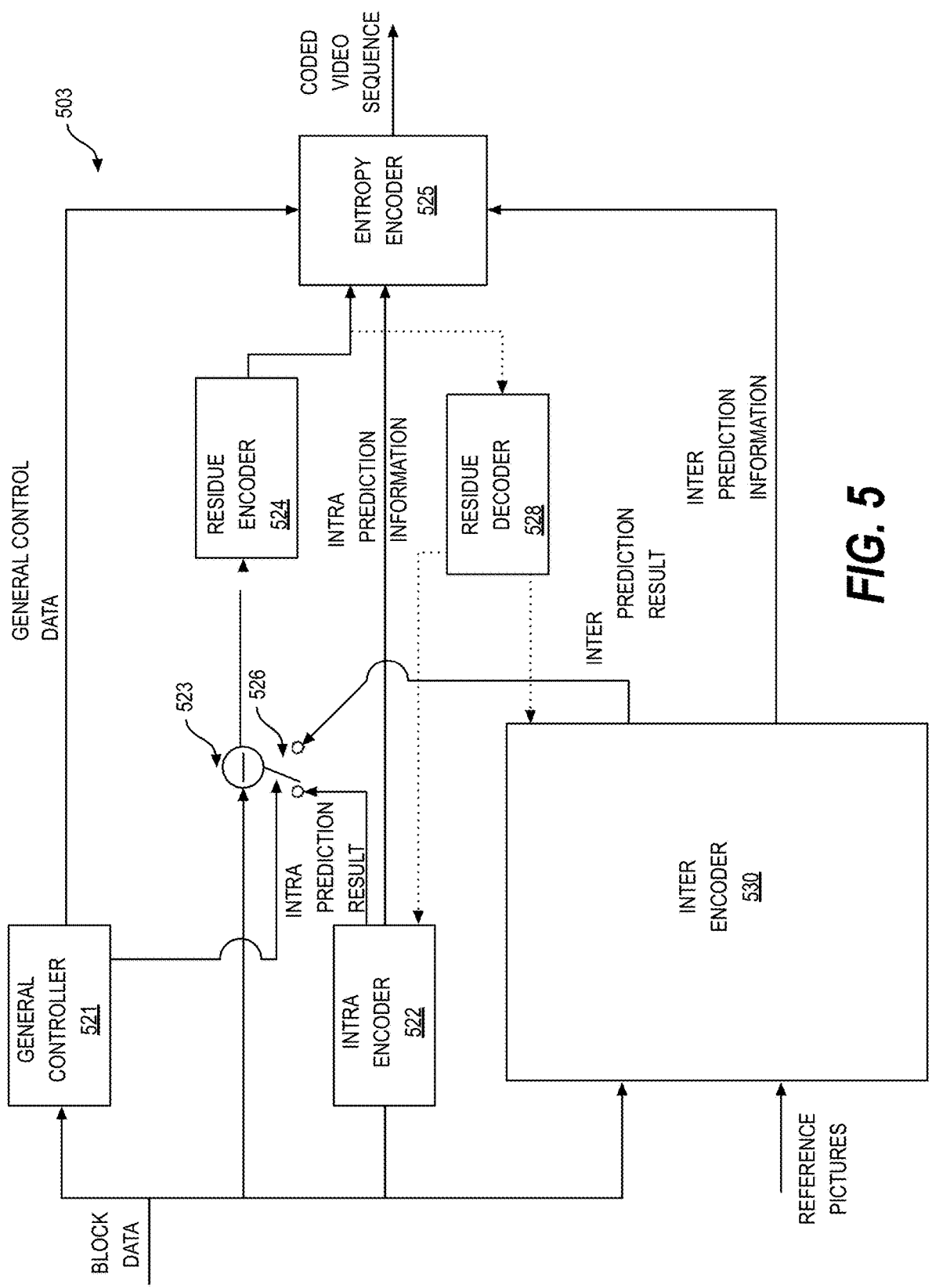
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
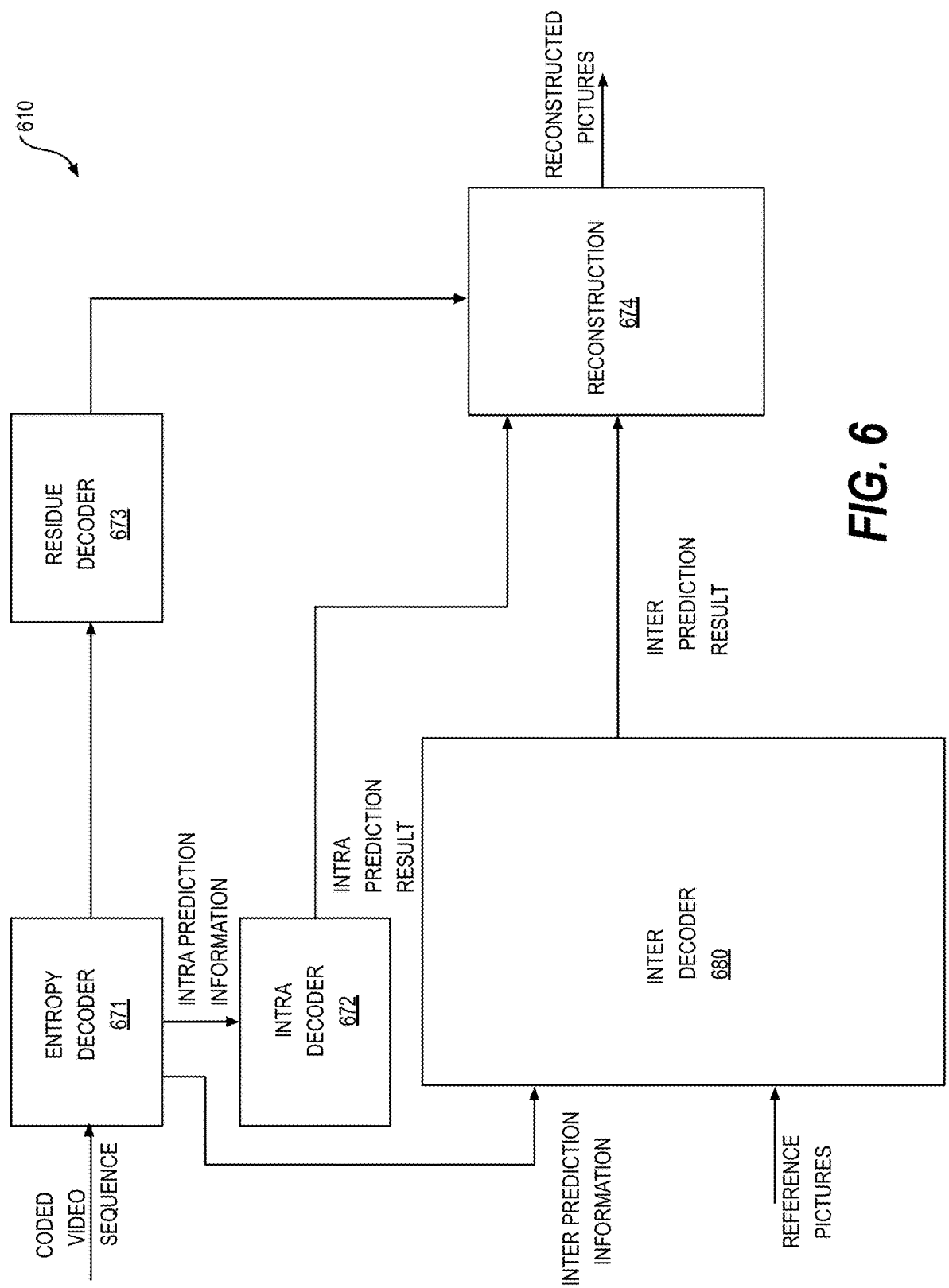
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions, and (810) can be implemented using one or more processors that execute software instructions.

In some example implementations, loop filters may be included in the encoders and decoders for reducing encoding artifacts and improving quality of the decoded pictures. For example, loop filters 356 may be included as part of the decoder 330 of FIG. 3. For another example, loop filters may be part of the embedded decoder unit 433 in the encoder 420 of FIG. 4. These filters are referred to as loop filters because they are included in the decoding loop for video blocks in decoders or encoders. Each loop filter may be associated with one or more filtering parameters. Such filtering parameters may be predefined or may be derived by the encoder during the encoding process. These filtering parameters (if derived by the encoder) or their indices (if predefined) may be included in the final bitstream in encoded form. A decoder may then parse these filtering parameters from the bitstream and perform loop filtering based on the parsed filtering parameters during decoding.

Various loop filters may be used for reducing coding artifact and improving decoded video quality in different aspects. Such loop filters may include but not limited to one or more deblocking filters, Adaptive Loop Filters (ALFs), Cross-Component Adaptive Loop Filters (CC-ALFs), Constrained Directional Enhancement Filters (CDEFs), Sample Adaptive Offset (SAO) filters, Cross-Component Sample Offset (CCSO) filters, and Local Sample Offset (LSO) filters. These filters may or may not be inter-dependent. They may be arranged in the decoding loop of the decoder or encoder in any suitable order that is compatible with their interdependence (if any). These various loop filters are described in more detail in the disclosure below.

An Adaptive Loop Filter (ALF) with block-based filter adaption can be applied by encoders/decoders to reduce artifacts. ALF is adaptive in the sense that the filtering coefficients/parameters or their indices are signaled in the bitstream and can be designed based on image content and distortion of the reconstructed picture. ALF may be applied to reduce distortion introduced by the encoding process and improve the reconstructed image quality.

For a luma component, one of a plurality of filters (e.g., 25 filters) may be selected for a luma block (e.g., a 4×4 luma block), for example, based on a direction and activity of local gradients. The filter coefficients of these filters may be derived by the encoder during encoding process and signaled to the decoder in the bitstream.

An ALF can have any suitable shape and size. Referring to the examples of FIG. 7, ALFs may have a diamond shape, such as a 5×5 diamond-shape for the ALF (710) and a 7×7 diamond-shape for the ALF (711). In the ALF (710), thirteen (13) elements can be used in the filtering process and form a diamond shape. Seven values (e.g., C0-C6) can be used and arranged in the illustrated example manner for the 13 elements. In the ALF (711), twenty-five (25) elements can be used in the filtering process and form a diamond shape. Thirteen (13) values (e.g., C0-C12) can be used for the 25 elements in the illustrated example manner.

Referring to FIG. 7, in some examples, ALF filters of one of the two diamond shapes (710)-(711) may be selected for processing a luma or chroma block. For example, the 5×5 diamond-shaped filter (710) can be applied for chroma components (e.g., chroma blocks, chroma CBs), and the 7×7 diamond-shaped filter (711) can be applied for a luma component (e.g., a luma block, a luma CB). Other suitable shape(s) and size(s) can be used in the ALF. For example, a 9×9 diamond-shaped filter can be used.

Filter coefficients at locations indicated by the values (e.g., C0-C6 in (710) or C0-C12 in (711)) can be non-zero. Further, when the ALF includes a clipping function, clipping values at the locations can be non-zero. The clipping function may be used to limit the upper bound of the filter value in the luma or chroma blocks.

In some implementations, a specific ALF to be applied to a particular block of a luma component may be based on a classification of the luma block. For block classification of a luma component, a 4×4 block (or luma block, luma CB) can be categorized or classified as one of multiple (e.g., 25) classes, corresponding to, e.g., 25 different ALFs (e.g., 25 of 7 by 7 ALFs with different filter coefficients). A classification index C can be derived based on a directionality parameter D and a quantized value A of an activity value A using Eq. (1).

$$C = 5D + \hat{A} \qquad \text{Eq. (1)}$$

To calculate the directionality parameter D and the quantized value Â, gradients $g_v$, $g_h$, $g_{d1}$, and $g_{d2}$ of a vertical, a horizontal, and two diagonal directions (e.g., d1 and d2), respectively, can be calculated using 1-D Laplacian as follows.

$$g_v = \sum_{k=i-2}^{i+3}\sum_{l=j-2}^{j+3} V_{k,l}, \; V_{k,l} = |2R(k,l) - R(k, l-1) - R(k, l+1)| \quad \text{Eq. (2)}$$

$$g_h = \sum_{k=i-2}^{i+3}\sum_{l=j-2}^{j+3} H_{k,l}, \; H_{k,l} = |2R(k,l) - R(k-1, l) - R(k+1, l)| \quad \text{Eq. (3)}$$

$$g_{d1} = \sum_{k=i-2}^{i+3}\sum_{l=j-3}^{j+3} D1_{k,l}, \qquad \text{Eq. (4)}$$

$$D1_{k,l} = |2R(k,l) - R(k-1, l-1) - R(k+1, l+1)|$$

$$g_{d2} = \sum_{k=i-2}^{i+3}\sum_{j=j-2}^{j+3} D2_{k,l}, \qquad \text{Eq. (5)}$$

$$D2_{k,l} = |2R(k,l) - R(k-1, l+1) - R(k+1, l-1)|$$

where indices i and j refer to coordinates of an upper left sample within the 4×4 block and R(k,l) indicates a reconstructed sample at a coordinate (k,l). The directions (e.g., d1 and d2) refer to 2 diagonal directions.

To reduce complexity of the block classification described above, a subsampled 1-D Laplacian calculation may be applied. FIGS. 8A-8D show examples of subsampled positions used for calculating the gradients $g_v$, $g_h$, $g_{d1}$, and $g_{d2}$ of the vertical (FIG. 8A), the horizontal (FIG. 8B), and the two diagonal directions d1 (FIG. 8C) and d2 (FIG. 8D), respectively. In FIG. 8A, labels 'V' show the subsampled positions to calculate the vertical gradient $g_v$. In FIG. 8B, labels 'H' show the subsampled positions to calculate the horizontal gradient $g_h$. In FIG. 8C, labels 'D1' show the subsampled positions to calculate the d1 diagonal gradient $g_{d1}$. In FIG. 8D, labels 'D2' show the subsampled positions to calculate the d2 diagonal gradient $g_{d2}$. FIGS. 8A and 8B show that the same subsampled positions can be used for gradient calculation of the different directions. In some other implementations, a different subsampling scheme can be used for all directions. In still some other implementations, different subsampling schemes can be used for different directions.

A maximum value $g_{h,v}^{max}$ and a minimum value $g_{h,v}^{min}$ of the gradients of horizontal and vertical directions $g_v$ and $g_h$ can be set as:

$$g_{h,v}^{max} = \max(g_h, g_v), \; g_{h,v}^{min} = \min(g_h, g_v) \qquad \text{Eq. (6)}$$

A maximum value $g_{d1,d2}^{max}$ and a minimum value $g_{d1,d2}^{min}$ of the gradients of two diagonal directions $g_{d1}$ and $g_{d2}$ can be set as:

$$g_{d1,d2}^{max} = \max(g_{d1}, g_{d2}), \; g_{d1,d2}^{min} = \min(g_{d1}, g_{d2}) \qquad \text{Eq. (7)}$$

The directionality parameter D can be derived based on the above values and two thresholds $t_1$ and $t_2$ as below.

Step 1. If (1) $g_{h,v}^{max} \leq t_1 \cdot g_{h,v}^{min}$ and (2) $g_{d1,d2}^{max} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

Figure 8E:
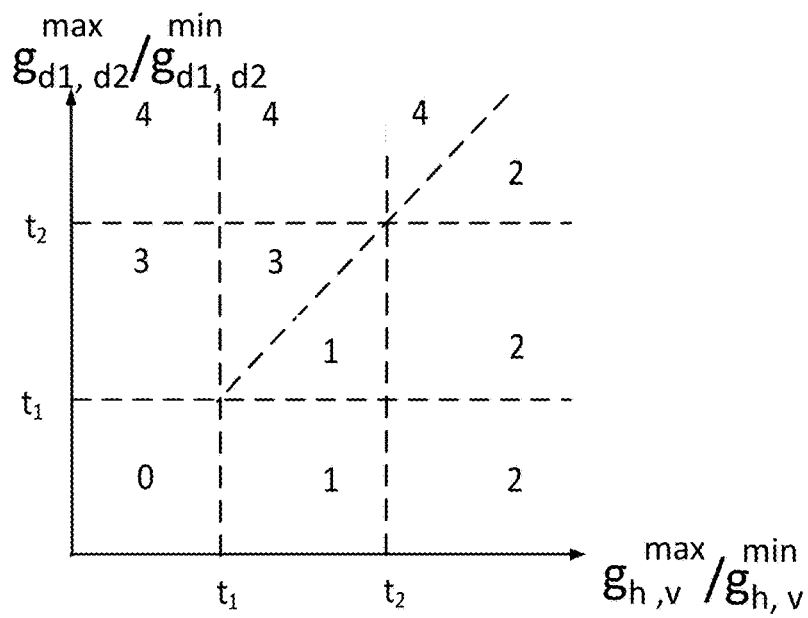
FIG. 8E shows an example manner to determine block directionality based on various gradients for use by an Adaptive Loop Filter (ALF).

In other words, the directionality parameter D is denoted by several discrete levels and are determined based on the gradient value spread for the luma block between horizontal and vertical directions, and between the two diagonal directions, as illustrated in FIG. 8E.

The activity value A can be calculated as:

$$A = \sum_{k=i-2}^{i+3}\sum_{l=j-2}^{j+3} (V_{k,l} + H_{k,l}) \qquad \text{Eq. (8)}$$

The activity value A thus represents a composite measure of horizontal and vertical 1-D Laplacians. The activation value A for the luma block can be further quantized to a range of, for example, 0 to 4, inclusively, and the quantized value is denoted as Â.

For the luma component, the classification index C as calculated above may then be used to select one of the multiple classes (e.g., 25 classes) of diamond-shaped AFL filters. In some implementations, for chroma components in a picture, no block classification may be applied, and thus a single set of ALF coefficients can be applied for each chroma component. In such implementations, while there may be multiple ALF coefficient sets available for chroma component, the determination of an ALF coefficient may not be dependent on any classification of a chroma block.

Geometric transformations can be applied to filter coefficients and corresponding filter clipping values (also referred to as clipping values). Before filtering a block (e.g., a 4×4 luma block), geometric transformations such as rotation or diagonal and vertical flipping can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning the respective directionality.

Three geometric transformation options, including a diagonal flip, a vertical flip, and a rotation can be performed as described by Eqs. (9)-(11), respectively.

$$f_D(k, l) = f(l, k), c_D(k, l) = c(l, k), \quad \text{Eq. (9)}$$

$$f_V(k, l) = f(k, K - l - 1), c_V(k, l) = c(k, K - l - 1) \quad \text{Eq. (10)}$$

$$f_R(k, l) = f(K - l - 1, k), c_R(k, l) = c(K - l - 1, k) \quad \text{Eq. (11)}$$

where K represents a size of the ALF or the filter, and 0≤k,l≤K−1 are coordinates of coefficients. For example, a location (0, 0) is at an upper left corner and a location (K−1, K−1) is at a lower right corner of the filter f or a clipping value matrix (or clipping matrix) c. The transformations can be applied to the filter coefficients f (k, l) and the clipping values c(k,l) depending on the gradient values calculated for the block. An example of a relationship between the transformation and the four gradients are summarized in Table 1.

TABLE 1

Mapping of the gradient calculated for a block and the transformation

| Gradient values | Transformation |
|---|---|
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, ALF filter parameters derived by the encoder may be signaled in an Adaptation Parameter Set (APS) for a picture. In the APS, one or more sets (e.g., up to 25 sets) of luma filter coefficients and clipping value indexes can be signaled. They may be indexed in the APS. In an example, a set of the one or more sets can include luma filter coefficients and one or more clipping value indexes. One or more sets (e.g., up to 8 sets) of chroma filter coefficients and clipping value indexes may be derived by the encoder and signaled. To reduce signaling overhead, filter coefficients of different classifications (e.g., having different classification indices) for luma components can be merged. In a slice header, indices of the APS's used for a current slice can be signaled. In another example, the signaling of ALF may be CTU based.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by one or more tables, such as a table (e.g., used for a luma CB) of the clipping value index and the corresponding clipping value for a luma component, and a table (e.g., used for a chroma CB) of the clipping value index and the corresponding clipping value for a chroma component.

The clipping value can be dependent on a bit depth B. The bit depth B may refer to an internal bit depth, a bit depth of reconstructed samples in a CB to be filtered, or the like. In some examples, a table of clipping values (e.g., for luma and/or for chroma) may be obtained using Eq. (12).

$$AlfClip = \{\text{round}(2^{B-\alpha+2}) \text{ for } n \in [0 \ldots N-1]\}, \quad \text{Eq. (12)}$$

where AlfClip is the clipping value, B is the bit depth (e.g., bitDepth), N (e.g., N=4) is a number of allowed clipping values, α is a pre-defined constant value. In an example, α is equal to 2.35. n is the clipping value index (also referred to as clipping index or clipIdx). Table 2 shows an example of a table obtained using Eq. (12) with N=4. The clipping index n can be 0, 1, 2, and 3 in Table 2 (up to N−1). Table 2 can be used for luma blocks or chroma blocks.

TABLE 2

AlfClip can depend on the bit depth B and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an example embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (e.g., up to 25 filters derived by the encoder, as described above, and also referred to as signaled filter set(s)) that are signaled in the APS's. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets. The pre-defined filters coefficients thus need not be signaled.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to decrease the multiplication complexity, a bitstream conformance can be applied so that the coefficient value of the non-central position can be in a range of −27 to 27−1, inclusive. In an example, the central position coefficient is not signaled in the bitstream and can be considered as equal to 128.

In some embodiments, the syntaxes and semantics of clipping index and clipping values are defined as follows: alf_luma_clip_idx[sfIdx][j] can be used to specify the clipping index of the clipping value to use before multiplying by the j-th coefficient of the signaled luma filter indicated by sfIdx. A requirement of bitstream conformance can include that the values of alf_luma_clip_idx[sfIdx][j] with sfIdx=0 to alf_luma_num_filters_signalled_minus1 and j=0 to 11 shall be in the range of, for example, 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepthY and clipIdx set equal to alf_luma_clip_idx[alf_luma_coeff_delta_idx [filtIdx]][j].

Alf_chroma_clip_idx[altIdx][j] can be used to specify the clipping index of the clipping value to use before multiplying by the j-th coefficient of the alternative chroma filter with index altIdx. A requirement of bitstream conformance can include that the values of alf_chroma_clip_idx[altIdx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id][altIdx][j],with altIdx=0 to alf_chroma_num_alt_filters_minus1, j=0 to 5 can be derived as specified in Table 2 depending on bitDepth set equal to BitDepthC and clipIdx set equal to alf_chroma_clip_idx[altIdx][j].

In an embodiment, the filtering process can be described as below. At a decoder side, when the ALF is enabled for a CTB, a sample R(i,j) within a CU (or CB) of the CTB can be filtered, resulting in a filtered sample value R'(i,j) as shown below using Eq. (13). In an example, each sample in the CU is filtered.

$$R'(i, j) = R(i, j) + \left(\left(\sum_{k \neq 0}\sum_{l \neq 0} f(k, l) \times K(R(i+k, j+l) - R(i, j), c(k, l)) + 64\right) \gg 7\right) \quad \text{Eq. (13)}$$

where f(k,l) denotes the decoded filter coefficients, K(x, y) is a clipping function, and c(k, l) denotes the decoded clipping parameters (or clipping values). The variables k and l can vary between −L/2 and L/2 where L denotes a filter length (e.g., L=5 and 7, for the example diamond filters 710 and 711 of FIG. 7 for luma and chroma components, respectively). The clipping function K(x, y)=min (y, max(−y, x)) corresponds to a clipping function Clip3 (−y, y, x). By incorporating the clipping function K(x, y), the loop filtering method (e.g., ALF) becomes a non-linear process, and can be referred to a nonlinear ALF.

The selected clipping values can be coded in an "alf_data" syntax element as follows: a suitable encoding scheme (e.g., a Golomb encoding scheme) can be used to encode a clipping index corresponding to the selected clipping value such as shown in Table 2. The encoding scheme can be the same encoding scheme used for encoding the filter set index.

Figure 9A:
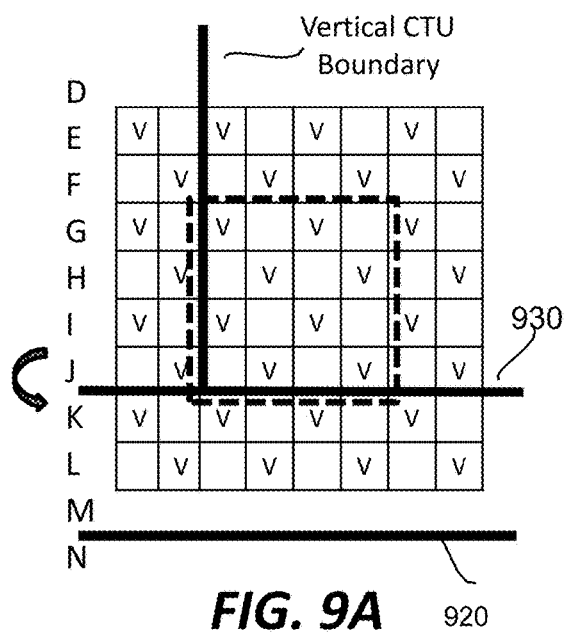
FIGS. 9A and 9B show modified block classifications at virtual boundaries according to example embodiments of the disclosure.

In an embodiment, a virtual boundary filtering process can be used to reduce a line buffer requirement of the ALF. Accordingly, modified block classification and filtering can be employed for samples near CTU boundaries (e.g., a horizontal CTU boundary). A virtual boundary (930) can be defined as a line by shifting a horizontal CTU boundary (920) by "N$_{samples}$" samples, as shown in FIG. 9A, where N$_{samples}$ can be a positive integer. In an example, N$_{samples}$ is equal to 4 for a luma component, and N$_{samples}$ is equal to 2 for a chroma component.

Figure 9B:
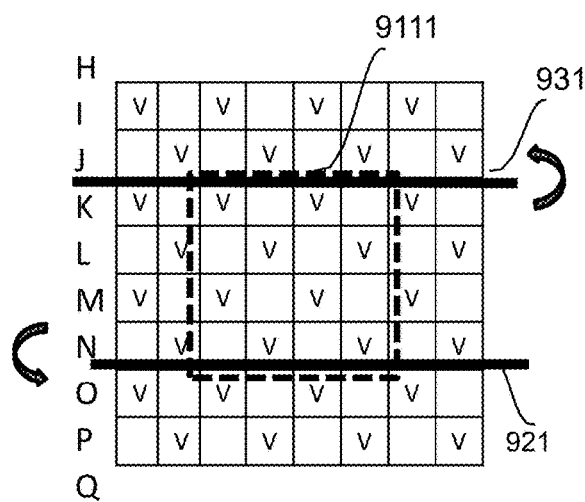

Referring to FIG. 9A, a modified block classification can be applied for a luma component. In an example, for the 1-D Laplacian gradient calculation of a 4×4 block (910) above the virtual boundary (930), only samples above the virtual boundary (930) are used. Similarly, referring to FIG. 9B, for a 1-D Laplacian gradient calculation of a 4×4 block (911) below a virtual boundary (931) that is shifted from a CTU boundary (921), only samples below the virtual boundary (931) are used. The quantization of an activity value A can be accordingly scaled by taking into account a reduced number of samples used in the 1D Laplacian gradient calculation.

Figures 10A, 10B, 10C, 10D, 10E, 10F:
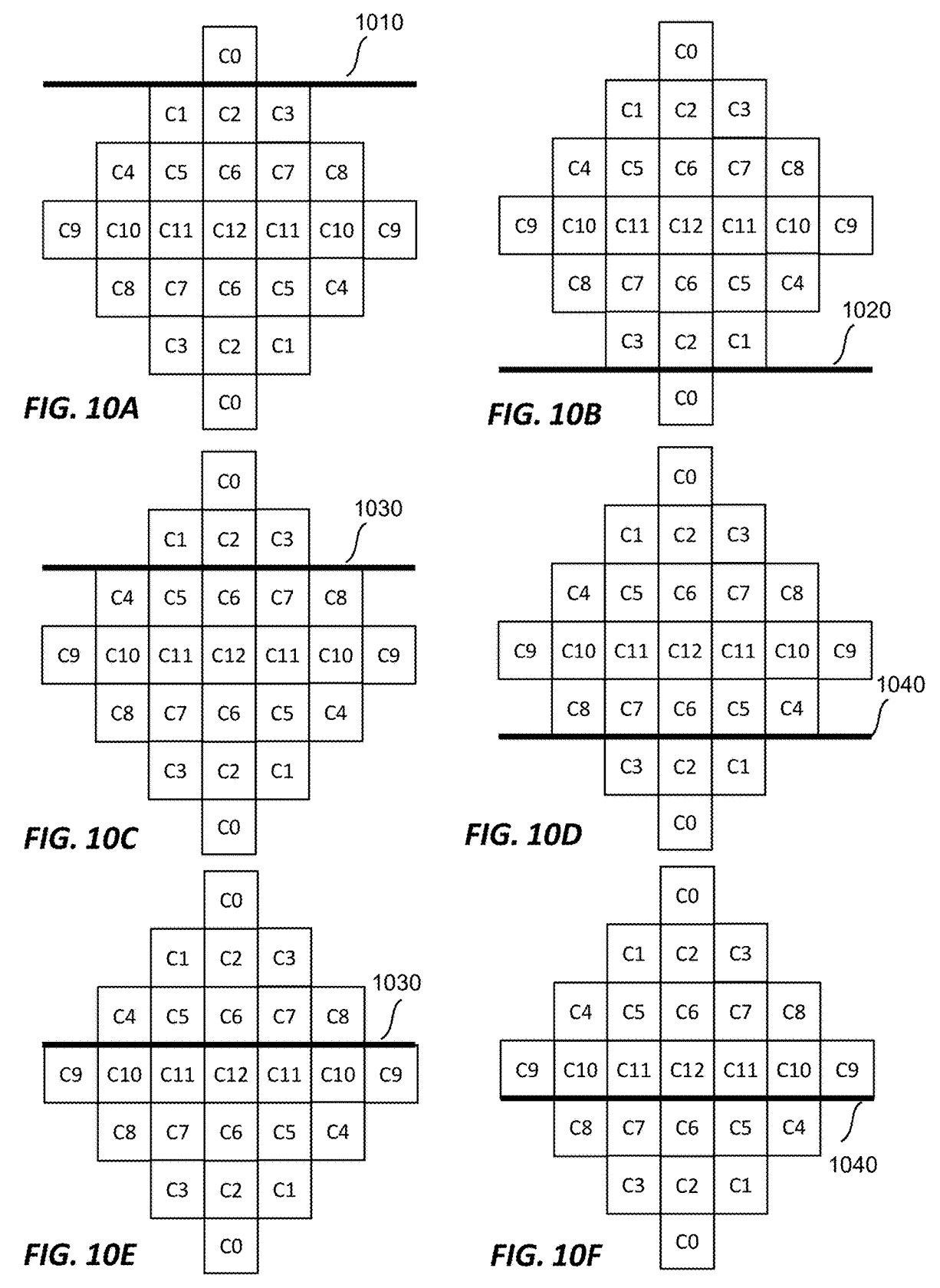

For a filtering processing, a symmetric padding operation at virtual boundaries can be used for both a luma component and a chroma component. FIGS. 10A-10F illustrate examples of such modified ALF filtering for a luma component at virtual boundaries. When a sample being filtered is located below a virtual boundary, neighboring samples that are located above the virtual boundary can be padded. When a sample being filtered is located above a virtual boundary, neighboring samples that are located below the virtual boundary can be padded. Referring to FIG. 10A, a neighboring sample C0 can be padded with a sample C2 that is located below a virtual boundary (1010). Referring to FIG. 10B, a neighboring sample C0 can be padded with a sample C2 that is located above a virtual boundary (1020). Referring to FIG. 10C, neighboring samples C1-C3 can be padded with samples C5-C7, respectively, that are located below a virtual boundary (1030). Sample C0 can be padded with sample C6. Referring to FIG. 10D, neighboring samples C$_1$-C$_3$ can be padded with samples C5-C7, respectively, that are located above a virtual boundary (1040). Sample C0 can be padded with sample C6. Referring to FIG. 10E, neighboring samples C4-C8 can be padded with samples C10, C11, C12, C11, and C10, respectively, that are located below a virtual boundary (1050). Samples C$_1$-C$_3$ can be padded with samples C11, C12, and C11. Sample C0 can be padded with sample C12. Referring to FIG. 10F, neighboring samples C4-C8 can be padded with samples C10, C11, C12, C11, and C10, respectively, that are located above a virtual boundary (1060). Samples C1-C3 can be padded with samples C11, C12, and C11. Sample C0 can be padded with sample C12.

In some examples, the above description can be suitably adapted when sample(s) and neighboring sample(s) are located to the left (or to the right) and to the right (or to the left) of a virtual boundary.

A largest coding unit (LCU)-aligned picture quadtree splitting can be used. In order to enhance coding efficiency, a coding unit synchronous picture quadtree-based adaptive loop filter can be used in video coding. In an example, a luma picture may be split into multiple multi-level quadtree partitions, and each partition boundary is aligned to boundaries of largest coding units (LCUs). Each partition can have a filtering process, and thus can be referred to as a filter unit or filtering unit (FU).

An example 2-pass encoding flow is described as follows. At a first pass, a quadtree split pattern and the best filter (or an optimal filer) of each FU can be decided. Filtering distortions can be estimated by a fast filtering distortion estimation (FFDE) during the decision process. According to the decided quadtree split pattern and the selected filters of the FUs (e.g., all FUs), a reconstructed picture can be filtered. At a second pass, a CU synchronous ALF on/off control can be performed. According to the ALF on/off results, the first filtered picture is partially recovered by the reconstructed picture.

Figure 11:
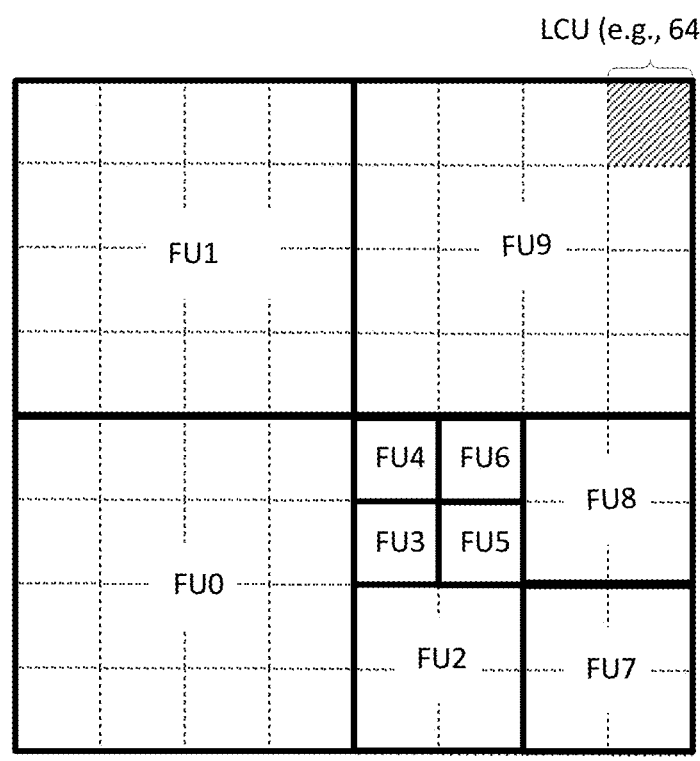
FIG. 11. shows an example of largest coding unit aligned picture quadtree splitting according to an embodiment of the disclosure.

A top-down splitting strategy can be adopted to divide a picture into multi-level quadtree partitions by using a rate-distortion criterion. Each partition can be referred to as a FU. The splitting process can align quadtree partitions with LCU boundaries, as shown in FIG. 11. FIG. 11 shows an example of LCU-aligned picture quadtree splitting according to an embodiment of the disclosure. In an example, an encoding order of FUs follows a z-scan order. For example, referring to FIG. 11, a picture is split into ten FUs (e.g., $FU_0$-$FU_9$, with a splitting depth of 2, with $FU_0$, $FU_1$, and $FU_9$ being the first level FUs, $FU_s$, $FU_7$, and $FU_8$ being the second depth level FUs, and $FU_3$-$FU_6$ being the third depth level FUs) and the encoding order is from $FU_0$ to $FU_9$, e.g., $FU_0$, $FU_1$, $FU_2$, $FU_3$, $FU_4$, $FU_5$, $FU_6$, $FU_7$, $FU_8$, and $FU_9$.

Figure 12:
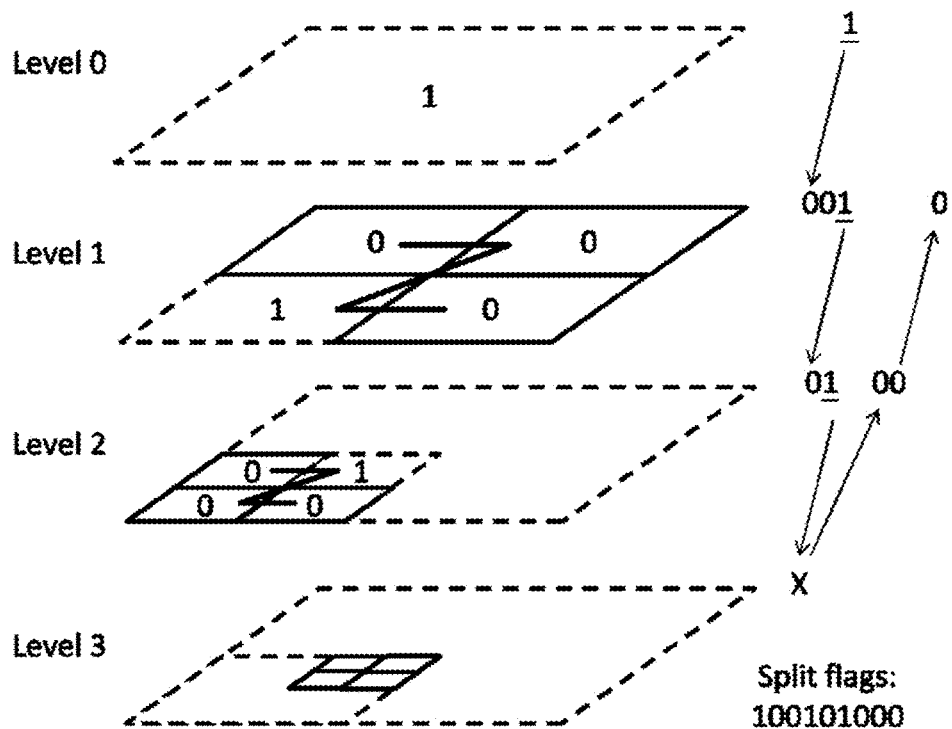
FIG. 12 shows a quadtree split pattern corresponding to FIG. 11 according to an example embodiment of the disclosure.

To indicate a picture quadtree split pattern, split flags ("1" representing a quadtree split, and "0" representing no quadtree split) can be encoded and transmitted in a z-scan order. FIG. 12 shows a quadtree split pattern corresponding to FIG. 11 according to an embodiment of the disclosure. As shown in an example in FIG. 12, quadtree split flags are encoded in a z scan order.

A filter of each FU can be selected from two filter sets based on a rate-distortion criterion. The first set can have ½-symmetric square-shaped and rhombus-shaped filters newly derived for a current FU. The second set can be from time-delayed filter buffers. The time-delayed filter buffers can store filters previously derived for FUs in prior pictures. The filter with the minimum rate-distortion cost of the two filter sets can be chosen for the current FU. Similarly, if the current FU is not the smallest FU and can be further split into four children FUs, the rate-distortion costs of the four children FUs can be calculated. By comparing the rate-distortion cost of the split and non-split cases recursively, the picture quadtree split pattern can be determined (in other words, whether the quadtree split of the current FU should stop).

In some examples, a maximum quadtree split level or depth may be limited to a predefined number. For example, the maximum quadtree split level or depth may be 2, and thus a maximum number of FUs may be 16 (or 4 to the power of maximum number of depth). During the quadtree split decision, correlation values for deriving Wiener coefficients of the 16 FUs at the bottom quadtree level (smallest FUs) can be reused. The remaining FUs can derive the Wiener filters of the remaining FUs from the correlations of the 16 FUs at the bottom quadtree level. Therefore, in an example, there is only one frame buffer access for deriving the filter coefficients of all FUs.

After the quadtree split pattern is determined, to further reduce the filtering distortion, the CU synchronous ALF on/off control can be performed. By comparing the filtering distortion and non-filtering distortion, a leaf CU can explicitly switch ALF on/off in a corresponding local region. The coding efficiency may be further improved by redesigning filter coefficients according to the ALF on/off results. In an example, the redesigning process needs additional frame buffer accesses. Thus, in some examples, such as a coding unit synchronous picture quadtree-based adaptive loop filter (CS-PQALF) encoder design, no redesign process is needed after the CU synchronous ALF on/off decision in order to minimize the number of frame buffer accesses.

A cross-component filtering process can apply cross-component filters, such as cross-component adaptive loop filters (CC-ALFs). The cross-component filter can use luma sample values of a luma component (e.g., a luma CB) to refine a chroma component (e.g., a chroma CB corresponding to the luma CB). In an example, the luma CB and the chroma CB are included in a CU.

Figure 13:
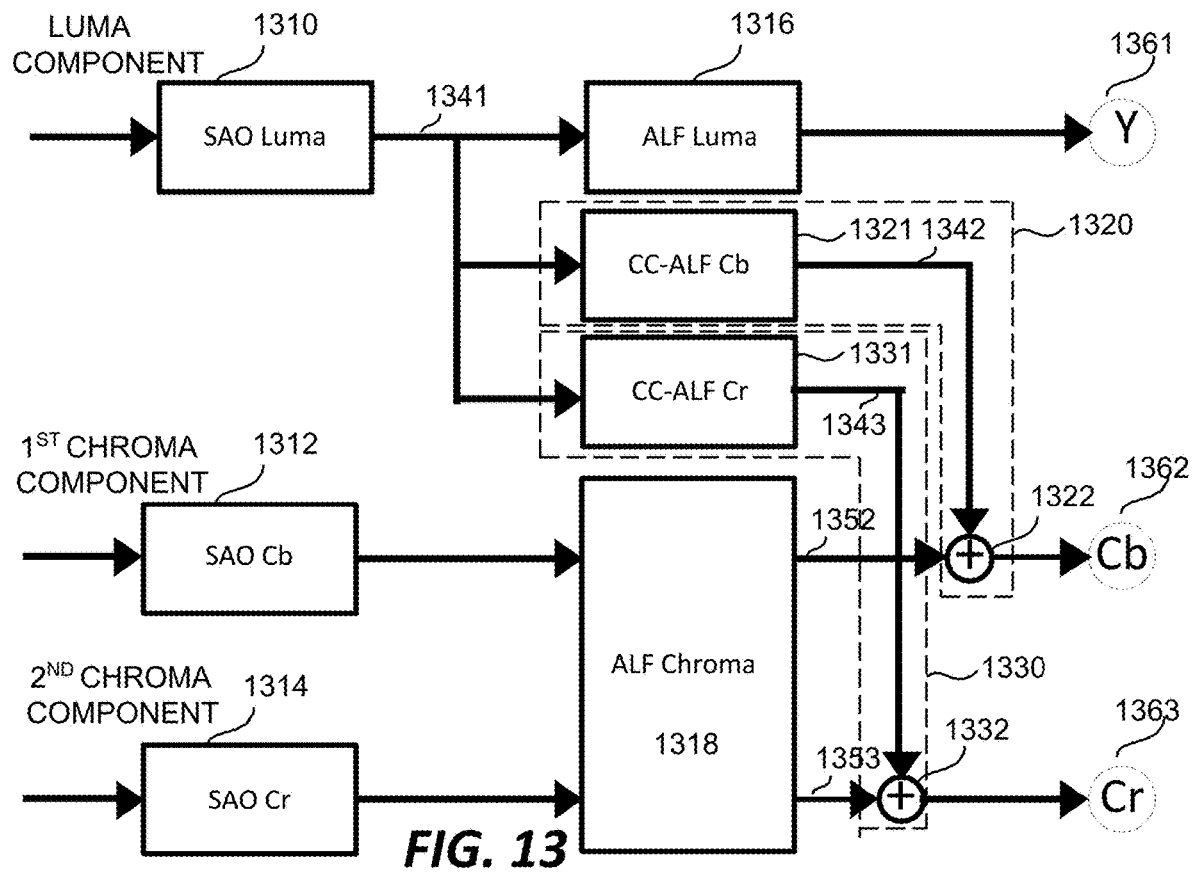
FIG. 13 shows cross-component filters used to generate chroma components according to an example embodiment of the disclosure.

FIG. 13 shows cross-component filters (e.g., CC-ALFs) used to generate chroma components according to an example embodiment of the disclosure. For example, FIG. 13 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (1310) to generate a SAO filtered luma component (1341). The SAO filtered luma component (1341) can be further filtered by an ALF luma filter (1316) to become a filtered luma CB (1361) (e.g., 'Y').

The first chroma component can be filtered by a SAO filter (1312) and an ALF chroma filter (1318) to generate a first intermediate component (1352). Further, the SAO filtered luma component (1341) can be filtered by a cross-component filter (e.g., CC-ALF) (1321) for the first chroma component to generate a second intermediate component (1342). Subsequently, a filtered first chroma component (1362) (e.g., 'Cb') can be generated based on at least one of the second intermediate component (1342) and the first intermediate component (1352). In an example, the filtered first chroma component (1362) (e.g., 'Cb') can be generated by combining the second intermediate component (1342) and the first intermediate component (1352) with an adder (1322). The example cross-component adaptive loop filtering process for the first chroma component thus can include a step performed by the CC-ALF (1321) and a step performed by, for example, the adder (1322).

The above description can be adapted to the second chroma component. The second chroma component can be filtered by a SAO filter (1314) and the ALF chroma filter (1318) to generate a third intermediate component (1353). Further, the SAO filtered luma component (1341) can be filtered by a cross-component filter (e.g., a CC-ALF) (1331) for the second chroma component to generate a fourth intermediate component (1343). Subsequently, a filtered second chroma component (1363) (e.g., 'Cr') can be generated based on at least one of the fourth intermediate component (1343) and the third intermediate component (1353). In an example, the filtered second chroma component (1363) (e.g., 'Cr') can be generated by combining the fourth intermediate component (1343) and the third intermediate component (1353) with an adder (1332). In an example, the cross-component adaptive loop filtering process for the second chroma component thus can include a step performed by the CC-ALF (1331) and a step performed by, for example, the adder (1332).

A cross-component filter (e.g., the CC-ALF (1321), the CC-ALF (1331)) can operate by applying a linear filter having any suitable filter shape to the luma component (or a luma channel) to refine each chroma component (e.g., the first chroma component, the second chroma component). The CC-ALF utilize correlation across color components to reduce coding distortion in one color component based on samples from another color component.

Figure 14:
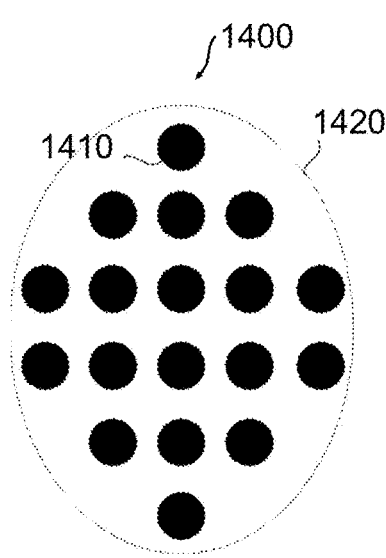
FIG. 14 shows an example of a cross-component ALF filter according to an embodiment of the disclosure.

FIG. 14 shows an example of a CC-ALF filter (1400) according to an embodiment of the disclosure. The filter (1400) can include non-zero filter coefficients and zero filter coefficients. The filter (1400) has a diamond shape (1420) formed by filter coefficients (1410) (indicated by circles having black fill). In an example, the non-zero filter coefficients in the filter (1400) are included in the filter coefficients (1410), and filter coefficients not included in the filter coefficients (1410) are zero. Thus, the non-zero filter coefficients in the filter (1400) are included in the diamond shape (1420), and the filter coefficients not included in the diamond shape (1420) are zero. In an example, a number of filter coefficients of the filter (1400) is equal to a number of the filter coefficients (1410), which is 18 in the example shown in FIG. 14.

The CC-ALF can include any suitable filter coefficients (also referred to as the CC-ALF filter coefficients). Referring back to FIG. 13, the CC-ALF (1321) and the CC-ALF (1331) can have a same filter shape, such as the diamond shape (1420) shown in FIG. 14, and a same number of filter coefficients. In an example, values of the filter coefficients in the CC-ALF (1321) are different from values of the filter coefficients in the CC-ALF (1331).

In general, filter coefficients (e.g., non-zero filter coefficients, as derived by the encoder) in a CC-ALF can be transmitted, for example, in the APS. In an example, the filter coefficients can be scaled by a factor (e.g., $2^{10}$) and can be rounded for a fixed-point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

In an example, the syntax changes of CC-ALF are described below in Table 3.

[yCtb>>CtbLog2SizeY]-th cross component Cb filter is applied to the block of Cb color component samples at the luma location (xCtb, yCtb).

alf_ctb_cross_component_cr_idc
  [xCtb>>CtbLog2SizeY][yCtb>>CtbLog2SizeY] equal to 0 can indicate that the cross component Cr filter is not applied to block of Cr color component samples at the luma location (xCtb, yCtb).

alf_ctb_cross_component_cr_idc
  [xCtb>>CtbLog2SizeY][yCtb>>CtbLog2SizeY] not equal to 0 can indicate that the alf_ctb_cross_component_cr_idc[xCtb>>CtbLog2SizeY]
  [yCtb>>CtbLog2SizeY]-th cross component Cr filter is applied to the block of Cr color component samples at the luma location (xCtb, yCtb).

Examples of chroma sampling formats are described below. In general, a luma block can correspond to one or more chroma blocks, such as two chroma blocks. A number of samples in each of the chroma block(s) can be less than a number of samples in the luma block. A chroma subsampling format (also referred to as a chroma subsampling format, e.g., specified by chroma_format_idc) can indicate a chroma horizontal subsampling factor (e.g., SubWidthC) and a chroma vertical subsampling factor (e.g., SubHeightC) between each of the chroma block(s) and the corresponding luma block. Chroma subsampling scheme may be specified as 4:x:y formats for a nominal 4 (horizontal) by 4 (vertical) block, with x being the horizontal chroma subsampling factor (the number of chroma samples retained in the first row of the block) and y being how many chroma samples are retained in the second row of the block. In an example, the chroma subsampling format may be 4:2:0, indicating that

TABLE 3

Syntax changes of CC-ALF

```
if ( slice_cross_component_alf_cb_enabled_flag )
  alf_ctb_cross_component_cb_idc[ xCtb >> CtbLog2SizeY ][ yCtb >> CtbLog2    ae(v)
SizeY ]
  if( slice_cross_component_alf_cb_enabled_flag = = 0 || alf_ctb_cross_component_
cb_idc[ xCtb >> CtbLog2SizeY ][ yCtb >> CtbLog2SizeY ] = = 0 )
    if( slice_alf_chroma_idc = = 1 || slice_alf_chroma_idc = = 3 ) {
      alf_ctb_flag[ 1 ][ xCtb >> CtbLog2SizeY ][ yCtb >> CtbLog2SizeY ]         ae(v)
      if( alf_ctb_flag[ 1 ][ xCtb >> CtbLog2SizeY ][ yCtb >> CtbLog2SizeY ]
        && aps_alf_chroma_num_alt_filters_minus1 > 0 )
    alf_ctb_filter_alt_idx[ 0 ][ xCtb >> CtbLog2SizeY ][ yCtb >> CtbLog2SizeY ]  ae(v)
    }
if ( slice_cross_component_alf_cr_enabled_flag )
  alf_ctb_cross_component_cr_idc[ xCtb >> CtbLog2SizeY ][ yCtb >> CtbLog2    ae(v)
SizeY ]
  if( slice_cross_component_alf_cr_enabled_flag = = 0 || alf_ctb_cross_component_
cr_idc[ xCtb >> CtbLog2SizeY ][ yCtb >> CtbLog2SizeY ] = = 0 )
    if( slice_alf_chroma_idc = = 2 || slice_alf_chroma_idc = = 3 ) {
      alf_ctb_flag[ 2 ][ xCtb >> CtbLog2SizeY ][ yCtb >> CtbLog2SizeY ]         ae(v)
      if( alf_ctb_flag[ 2 ][ xCtb >> CtbLog2SizeY ][ yCtb >> CtbLog2SizeY ]
        && aps_alf_chroma_num_alt_filters_minus1 > 0 )
    alf_ctb_filter_alt_idx[ 1 ][ xCtb >> CtbLog2SizeY ][ yCtb >> CtbLog2SizeY ]  ae(v)
    }
```

Figure 15:
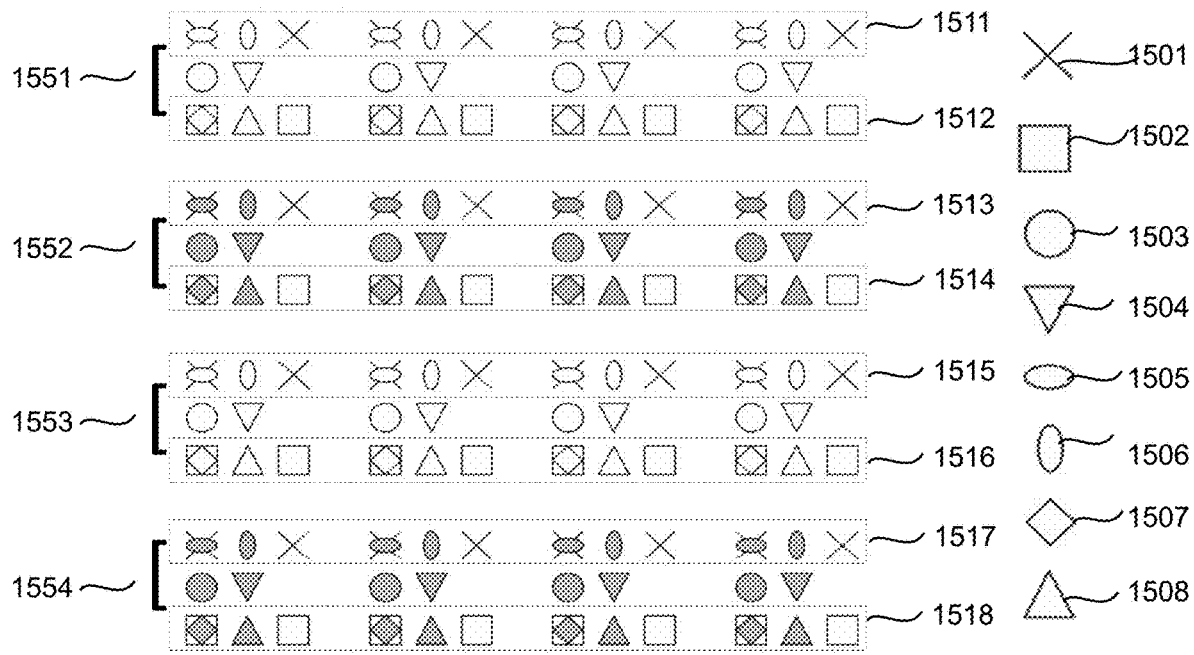
FIG. 15 show exemplary locations of chroma samples relative to luma samples according to embodiments of the disclosure.

The semantics of the example CC-ALF related syntaxes above can be described below:

alf_ctb_cross_component_cb_idc
  [IxCtb>>CtbLog2SizeY][yCtb>>CtbLog2SizeY] equal to 0 can indicate that the cross component Cb filter is not applied to a block of Cb color component samples at a luma location (xCtb, yCtb).

alf_ctb_cross_component_cb_idc
  [xCtb>>CtbLog2SizeY][yCtb>>CtbLog2SizeY] not equal to 0 can indicate that the alf_ctb_cross_component_cbidc[xCtb>>CtbLog2SizeY]

the chroma horizontal subsampling factor (e.g., SubWidthC) and the chroma vertical subsampling factor (e.g., SubHeightC) are both 2, as shown in FIGS. 15A-15B. In another example, the chroma subsampling format may be 4:2:2, indicating that the chroma horizontal subsampling factor (e.g., SubWidthC) is 2, and the chroma vertical subsampling factor (e.g., SubHeightC) is 1. In yet another example, the chroma subsampling format may be 4:4:4, indicating that the chroma horizontal subsampling factor (e.g., SubWidthC) and the chroma vertical subsampling factor (e.g., SubHeightC) are 1. As such, a chroma sample format or type (also referred to as a chroma sample position) can indicate a relative position of a chroma sample in the chroma block with respect to at least one corresponding luma sample in the luma block.

FIGS. 15A-15B show exemplary locations of chroma samples relative to luma samples according to embodiments of the disclosure. Referring to FIG. 15A, the luma samples (1501) are located in rows (1511)-(1518). The luma samples (1501) shown in FIG. 15A can represent a portion of a picture. In an example, a luma block (e.g., a luma CB) includes the luma samples (1501). The luma block can correspond to two chroma blocks having the chroma subsampling format of 4:2:0. In an example, each chroma block includes chroma samples (1503). Each chroma sample (e.g., the chroma sample (1503(1)) corresponds to four luma samples (e.g., the luma samples (1501(1))-(1501(4)). In an example, the four luma samples are the top-left sample (1501(1)), the top-right sample (1501(2)), the bottom-left sample (1501(3)), and the bottom-right sample (1501(4)). The chroma sample (e.g., (1503(1))) may be located at a left center position that is between the top-left sample (1501(1)) and the bottom-left sample (1501(3)), and a chroma sample type of the chroma block having the chroma samples (1503) can be referred to as a chroma sample type 0. The chroma sample type 0 indicates a relative position 0 corresponding to the left center position in the middle of the top-left sample (1501(1)) and the bottom-left sample (1501(3)). The four luma samples (e.g., (1501(1))-(1501(4))) can be referred to as neighboring luma samples of the chroma sample (1503) (1).

In an example, each chroma block may include chroma samples (1504). The above description with reference to the chroma samples (1503) can be adapted to the chroma samples (1504), and thus detailed descriptions can be omitted for purposes of brevity. Each of the chroma samples (1504) can be located at a center position of four corresponding luma samples, and a chroma sample type of the chroma block having the chroma samples (1504) can be referred to as a chroma sample type 1. The chroma sample type 1 indicates a relative position 1 corresponding to the center position of the four luma samples (e.g., (1501(1))-(1501(4))). For example, one of the chroma samples (1504) can be located at a center portion of the luma samples (1501(1))-(1501(4)).

In an example, each chroma block includes chroma samples (1505). Each of the chroma samples (1505) can be located at a top left position that is co-located with the top-left sample of the four corresponding luma samples (1501), and a chroma sample type of the chroma block having the chroma samples (1505) can be referred to as a chroma sample type 2. Accordingly, each of the chroma samples (1505) is co-located with the top left sample of the four luma samples (1501) corresponding to the respective chroma sample. The chroma sample type 2 indicates a relative position 2 corresponding to the top left position of the four luma samples (1501). For example, one of the chroma samples (1505) can be located at a top left position of the luma samples (1501(1))-(1501(4)).

In an example, each chroma block includes chroma samples (1506). Each of the chroma samples (1506) can be located at a top center position between a corresponding top-left sample and a corresponding top-right sample, and a chroma sample type of the chroma block having the chroma samples (1506) can be referred to as a chroma sample type 3. The chroma sample type 3 indicates a relative position 3 corresponding to the top center position between the top-left sample and the top-right sample. For example, one of the chroma samples (1506) can be located at a top center position of the luma samples (1501(1))-(1501(4)).

In an example, each chroma block includes chroma samples (1507). Each of the chroma samples (1507) can be located at a bottom left position that is co-located with the bottom-left sample of the four corresponding luma samples (1501), and a chroma sample type of the chroma block having the chroma samples (1507) can be referred to as a chroma sample type 4. Accordingly, each of the chroma samples (1507) is co-located with the bottom left sample of the four luma samples (1501) corresponding to the respective chroma sample. The chroma sample type 4 indicates a relative position 4 corresponding to the bottom left position of the four luma samples (1501). For example, one of the chroma samples (1507) can be located at a bottom left position of the luma samples (1501(1))-(1501)(4)).

In an example, each chroma block includes chroma samples (1508). Each of the chroma samples (1508) is located at a bottom center position between the bottom-left sample and the bottom-right sample, and a chroma sample type of the chroma block having the chroma samples (1508) can be referred to as a chroma sample type 5. The chroma sample type 5 indicates a relative position 5 corresponding to the bottom center position between the bottom-left sample and the bottom-right sample of the four luma samples (1501). For example, one of the chroma samples (1508) can be located between the bottom-left sample and the bottom-right sample of the luma samples (1501(1))-(1501)(4)).

In general, any suitable chroma sample type can be used for a chroma subsampling format. The chroma sample types 0-5 provide exemplary chroma sample types described with the chroma subsampling format 4:2:0. Additional chroma sample types may be used for the chroma subsampling format 4:2:0. Further, other chroma sample types and/or variations of the chroma sample types 0-5 can be used for other chroma subsampling formats, such as 4:2:2, 4:4:4, or the like. In an example, a chroma sample type combining the chroma samples (1505) and (1507) may be used for the chroma subsampling format 4:2:2.

In another example, the luma block is considered to have alternating rows, such as the rows (1511)-(1512) that include the top two samples (e.g., (1501(1))-(1501)(2))) of the four luma samples (e.g., (1501(1))-(1501)(4))) and the bottom two samples (e.g., (1501(3))-(1501)(4))) of the four luma samples (e.g., (1501(1)-(1501)(4))), respectively. Accordingly, the rows (1511), (1513), (1515), and (1517) can be referred to as current rows (also referred to as a top field), and the rows (1512), (1514), (1516), and (1518) can be referred to as next rows (also referred to as a bottom field). The four luma samples (e.g., (1501(1))-(1501)(4))) are located at the current row (e.g., (1511)) and the next row (e.g., (1512)). The relative chroma positions 2-3 above are located in the current rows, the relative chroma positions 0-1 above are located between each current row and the respective next row, and the relative chroma positions 4-5 above are located in the next rows.

The chroma samples (1503), (1504), (1505), (1506), (1507), or (1508) are located in rows (1551)-(1554) in each chroma block. Specific locations of the rows (1551)-(1554) can depend on the chroma sample type of the chroma samples. For example, for the chroma samples (1503)-(1504) having the respective chroma sample types 0-1, the row (1551) is located between the rows (1511)-(1512). For the chroma samples (1505)-(1506) having the respective the chroma sample types 2-3, the row (1551) is co-located with the current row (1511). For the chroma samples (1507)-(1508) having the respective the chroma sample types 4-5, the row (1551) is co-located with the next row (1512). The above descriptions can be suitably adapted to the rows (1552)-(1554), and the detailed descriptions are omitted for brevity.

Any suitable scanning method can be used for displaying, storing, and/or transmitting the luma block and the corresponding chroma block(s) described above in FIG. 15A. In some example implementations, progressive scanning may be used.

Alternatively, an interlaced scan may be used, as shown in FIG. 15B. As described above, the chroma subsampling format may be 4:2:0 (e.g., chroma_format_idc is equal to 1). In an example, a variable chroma location type (e.g., ChromaLocType) may indicate the current rows (e.g., ChromaLocType is chroma_sample_loc_type_top_field) or the next rows (e.g., ChromaLocType is chroma_sample_loc_type_bottom_field). The current rows (1511), (1513), (1515), and (1517) and the next rows (1512), (1514), (1516), and (1518) can be scanned separately. For example, the current rows (1511), (1513), (1515), and (1517) can be scanned first followed by the next rows (1512), (1514), (1516), and (1518) being scanned. The current rows can include the luma samples (1501) while the next rows can include the luma samples (1502).

Similarly, the corresponding chroma block can be scanned in an interlaced manner. The rows (1551) and (1553) including the chroma samples (1503), (1504), (1505), (1506), (1507), or (1508) with no fill can be referred to as current rows (or current chroma rows), and the rows (1552) and (1554) including the chroma samples (1503), (1504), (1505), (1506), (1507), or (1508) with gray fill can be referred to as next rows (or next chroma rows). In an example, during the interlaced scan, the rows (1551) and (1553) may be scanned first followed by scanning the rows (1552) and (1554).

Besides ALF described above, a constrained directional enhancement filter (CDEF) may also be used for loop filtering in video coding. An in-loop CDEF may be used to filter out coding artifacts such as quantization ringing artifacts while retaining details of an image. In some coding technologies, a sample adaptive offset (SAO) algorithm may be employed to achieve a similar goal by defining signal offsets for different classes of pixels. Unlike SAO, a CDEF is a non-linear spatial filter. In some examples, the design of the CDEF filter is constrained to be easily vectorizable (e.g., implementable with single instruction, multiple data (SIMD) operations), which was not the case for other non-linear filters such as a median filter and a bilateral filter.

The CDEF design originates from the following observations. In some situations, an amount of ringing artifacts in a coded image can be approximately proportional to a quantization step size. The smallest detail retained in the quantized image is also proportional to the quantization step size. As such, retaining image details would demand smaller quantization step size which would yield higher undesirable quantization ringing artifacts. Fortunately, for a given quantization step size, the amplitude of the ringing artifacts can be less than the amplitude of the details, thereby affording an opportunity for designing a CDEF to strike a balance to filter out the ringing artifacts while maintaining sufficient details.

A CDEF can first identify a direction of each block. The CDEF can then adaptively filter along the identified direction and to a lesser degree along directions rotated 45° from the identified direction. The filter strengths can be signaled explicitly, allowing a high degree of control over blurring of details. An efficient encoder search can be designed for the filter strengths. CDEF can be based on two in-loop filters and the combined filter can be used for video coding. In some example implementations, the CDEF filter(s) may follow deblocking filter(s) for in-loop filtering.

Figure 16:
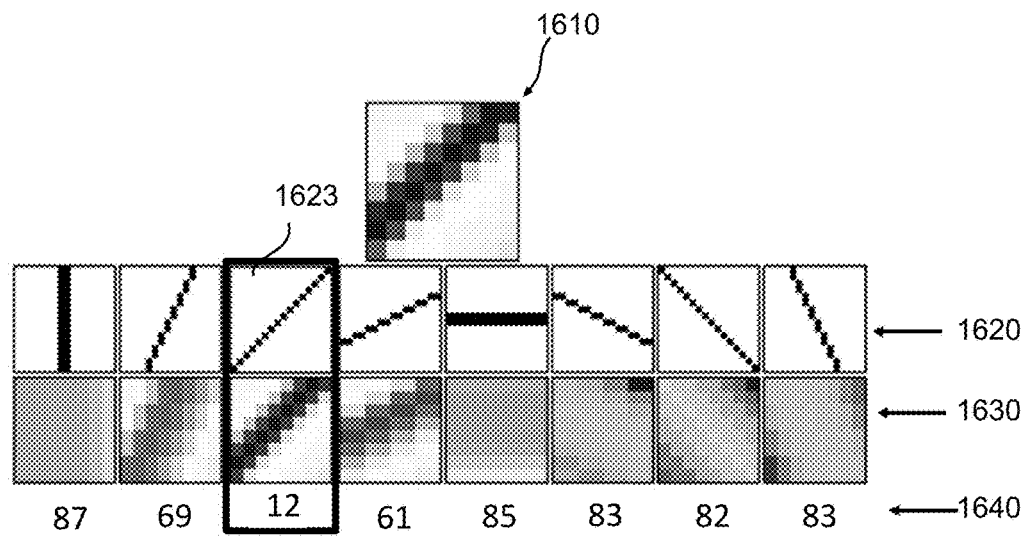
FIG. 16 shows an example of direction search for a block according to an embodiment of the disclosure.

The direction search can operate on reconstructed pixels (or samples), for example, after a deblocking filter, as illustrated in FIG. 16. Since the reconstructed pixels are available to a decoder, the directions may not require signaling. The direction search can operate on blocks having a suitable size (e.g., 8×8 blocks) that are small enough to adequately handle non-straight edges (so that the edges appear sufficient straight in the filtering blocks) and are large enough to reliably estimate directions when applied to a quantized image. Having a constant direction over an 8×8 region can make vectorization of the filter easier. For each block, the direction that best matches a pattern in the block can be determined by minimizing a difference measure, such as a sum of squared differences (SSD), RMS error, and the like, between the quantized block and each of the perfectly directional blocks. In an example, a perfectly directional block (e.g., one of (1620) of FIG. 16) refers to a block where all pixels along a line in one direction have the same value. FIG. 16 shows an example of direction search for an 8×8 block (1610) according to an example embodiment of the disclosure. In an example shown in FIG. 16, the 45-degree direction (1623) among a set of directions (1620) is selected because the 45-degree direction (1623) can minimize the error (1640). For example, the error for the 45-degree direction is 12 and is the smallest among the errors ranging from 12 to 87 indicated by a row (1640).

An example non-linear low-pass directional filter is described in further detail below. Identifying the direction can help align filter taps along the identified direction to reduce ringing artifacts while preserving the directional edges or patterns. However, in some examples, directional filtering alone cannot sufficiently reduce ringing artifacts. It is desired to use additional filter taps on pixels that do not lie along a main direction (e.g., the identified direction). To reduce the risk of blurring, the additional filter taps can be treated more conservatively. Accordingly, a CDEF can define primary taps and secondary taps. In some example implementations, a complete two-dimensional (2-D) CDEF filter may be expressed as $$y(i, j) = x(i, j) + \text{round}\left(\sum_{m,n} w_{d,m,n}^{(p)} f\left(x(m, n) - x(i, j), S^{(p)}, D\right) + \sum_{m,n} w_{d,m,n}^{(s)} f\left(x(m, n) - x(i, j), S^{(s)}, D\right)\right), \quad \text{Eq. (14)}$$

In Eq. (14), D represents a damping parameter, $S^{(p)}$ and $S^{(s)}$ represent the strengths of the primary and secondary taps, respectively, and a function round(•-) can round ties away from zero, $w_{d,m,n}^{(p)}$ and $w_{d,m,n}^{(s)}$ represent the filter weights, and f(d, S, D) represents a constraint function operating on a difference d (e.g., d=x(m, n)−x(i, j)) between a filtered pixel (e.g., x(i, j)) and each of the neighboring pixels (e.g., x(m, n)). When the difference is small, f(d, S, D) can be equal to the difference d (e.g., f(d, S, D)=d), and thus the filter can behave as a linear filter. When the difference is large, f(d, S, D) can be equal to 0 (e.g., f(d, S, D)=0), which effectively ignores the filter tap.

As another in-loop processing component, a set of in-loop restoration schemes may be used in video coding post deblocking to generally de-noise and enhance the quality of edges beyond a deblocking operation. The set of in-loop restoration schemes can be switchable within a frame (or a picture) per suitably sized tile. Some examples of the in-loop restoration schemes are described below based on separable symmetric Wiener filters and dual self-guided filters with subspace projection. Because content statistics can vary substantially within a frame, the filters can be integrated within a switchable framework where different filters can be triggered in different regions of the frame.

An example separable symmetric Wiener filter is described below. The Wiener filter can be used as one of the switchable filters. Every pixel (or sample) in a degraded frame can be reconstructed as a non-causal filtered version of pixels within a w×w window around the pixel, where w=2r+1 and is odd for an integer r. The 2-D filter taps can be denoted by a vector F in a column-vectorized form having $w^2 \times 1$ elements, and a straightforward linear minimum mean square error (LMMSE) optimization may lead to filter parameters given by $F=H^{-1}M$, where H is equal to $E[XX^T]$ and is the auto-covariance of x, the column-vectorized version of the $w^2$ samples in the w×w window around a pixel, and where M is equal to $E[YX^T]$ representing the cross correlation of x with the scalar source sample y to be estimated. The encoder can be configured to estimate H and M from realizations in the deblocked frame and the source, and send the resultant filter F to a decoder. However, in some example implementations, a substantial bitrate cost can occur in transmitting $w^2$ taps. Further, non-separable filtering can make decoding prohibitively complex. Therefore, a plurality of additional constraints may be imposed on the nature of F. For example, F may be constrained to be separable so that the filtering can be implemented as separable horizontal and vertical w-tap convolutions. In an example, each of the horizontal and vertical filters are constrained to be symmetric. Further, in some example implementations, a sum of the horizontal and vertical filter coefficients may be assumed to sum to 1.

Dual self-guided filtering with subspace projection may also be used as one of the switchable filters for in-loop restoration and is described below. In some example implementations, guided filtering can be used in image filtering where a local linear model is used to compute a filtered output y from an unfiltered sample x. The local linear model may be written as $$y = Fx + G \qquad \text{Eq. (15)}$$

where F and G can be determined based on statistics of a degraded image and a guidance image (also referred to as a guide image) in a neighborhood of the filtered pixel. If the guide image is identical to the degraded image, the resultant self-guided filtering can have the effect of edge preserving smoothing. According to some aspects of the disclosure, the specific form of self-guided filtering may depend on two parameters: a radius r and a noise parameter e, and is enumerated as follows:
1. Obtain a mean and a variance $\sigma^2$ of pixels in a (2r+1)×(2r+1) window around every pixel. For example, obtaining the mean and the variance $\sigma^2$ of the pixels may be implemented efficiently with box filtering based on integral imaging.
2. Compute parameters f and g for every pixel based on Eq. (16)

$$f = \sigma^2/(\sigma^2 + e); g = (1 - f)\mu \qquad \text{Eq. (16)}$$

3. Compute F and G for every pixel as averages of values of the parameters f and g in a 3×3 window around the pixel for use.

The dual self-guided filtering may be controlled by the radius r and the noise parameter e, where a larger radius r can imply a higher spatial variance and a higher noise parameter e can imply a higher range variance.

FIG. 17 shows an example of a subspace projection according to an example embodiment of the disclosure. In the example shown in FIG. 17, the subspace projection may use cheap restorations $X_1$ and $X_2$ to produce a final restoration $X_f$ closer to a source Y. Even though cheap restorations $X_1$ and $X_2$ are not close to a source Y, appropriate multipliers $\{\alpha, \beta\}$ can bring the cheap restorations $X_1$ and $X_2$ much closer to the source Y if the cheap restorations $X_1$ and $X_2$ move in the right direction. For example, the final restoration $X_f$ may be obtained based on Eq. (17) below.

$$X_f = X + \alpha(X_1 - X) + \beta(X_2 - X) \qquad \text{Eq. (17)}$$

Besides the deblocking filter, the ALF, the CDEF, and the loop restoration described above, a loop filtering method referred to as a Cross-Component Sample Offset (CCSO) filter or CCSO, may also be implemented in the loop filtering process to reduce distortion of reconstructed samples (also referred to as reconstruction samples). The CCSO filter may be placed anywhere within the loop filing stage. An example of CCSO filter is shown in FIG. 18 in relation to deblocking, CDEF, and LR filters. In a CCSO filtering process, a non-linear mapping can be used to determine an output offset based on processed input reconstructed samples of a first color component. The output offset can be added to a reconstructed sample of a second color component in a filtering process of CCSO.

The input reconstructed samples can be from the first color component located in a filter support area, as shown in FIG. 19. Specifically, FIG. 19 shows an example of the filter support area in a CCSO filter according to an embodiment of the disclosure. The filter support area can include four reconstructed samples: p0 and p1. The two input reconstructed samples in the example of FIG. 19 are on both sides of a center sample in the vertical direction. In an example, a center sample (denoted by rl) in the first color component (e.g., a luma component) and a sample (denoted by rc) to be filtered in the second color component (e.g., a chroma component) are co-located. When processing the input reconstructed samples, the following steps can be applied:

Step 1: Delta values (e.g., differences) between the four reconstructed samples: p0 and p1 and the center sample rl are computed, and are denoted as m0 and m1, respectively. For example, the delta value between p0 and rl is m0.

Step 2: The delta values m0 to m1 can be further quantized into a number of (e.g., 2) discrete values. The quantized values can be denoted, for example, as d0 and d1 for m0 and m1, respectively. In an example, the quantized value for each of the d0 and d1 may be −1, 0, or 1 based on the following quantization process:

$$di = -1, \text{ if } mi < -N; \qquad \text{Eq. (18)}$$

-continued $$di = 0, \text{ if } -N <= mi <= N;\quad \text{Eq. (19)}$$

$$di = 1, \text{ if } mi > N.\quad \text{Eq. (20)}$$

where N is a quantization step size, example values of N are 4, 8, 12, 16, and the like, di and mi refer respectively to quantized value and the delta value where i is 0, 1, 2, or 3.

The quantized values d0 to d3 can be used to identify a combination of the non-linear mapping. In the example shown in FIG. 19, the CCSO filter has two filter inputs d0 to d1, and each filter input can have one of the three quantized values (e.g., −1, 0, and 1), and thus a total number of combinations is 9 (e.g., 32, number of quantized values to the power of number of differences). An example of the 9 combinations with offset values are shown in Table 4 below as a lookup table (LUT).

TABLE 4

Example LUT used in CCSO

| combination index | d0 | d1 | offset |
|---|---|---|---|
| 0 | −1 | −1 | s0 |
| 1 | −1 | 0 | s1 |
| 2 | −1 | 1 | s2 |
| 3 | 0 | −1 | s3 |
| 4 | 0 | 0 | s4 |
| 5 | 0 | 1 | s5 |
| 6 | 1 | −1 | s6 |
| 7 | 1 | 0 | s7 |
| 8 | 1 | 1 | s8 |

The last column can represent the output offset value for each combination, which can be looked up according to the deltas. The output offset values can be integers, such as 0, 1, −1, 3, −3, 5, −5, −7, and the like.

The first column represents indices assigned to these combinations of quantized d0 and d1. The middle columns represent all possible combinations of the quantized d0 and d1 (with three possible quantization levels). The offset column may comprise actual offset values. Alternatively, there may be a limited number of allowed offset values, and the offset column in Table 4 may comprises indexes to the allowed offset values. As such, the term offset value and index may be used interchangeably.

The final filtering process of the CCSO filter can be applied as follows:

$$f' = \text{clip}(f + s),\quad \text{Eq. (21)}$$

where f is the reconstructed sample to be filtered, s is the output offset value, for example, retrieved from ta LUT. In an example shown in Eq. (21), the filtered sample value f' of the reconstructed sample to be filtered f can be further clipped into a range associated with a bit-depth.

The example CCSO filtering of reconstructed sample rc in the second color to be filtered corresponding to sample c of the first color with p0 and p1 of the first color, as shown in FIG. 19, may be referred to as a 3-tap CCSO filter design. Alternatively, other CCSO design with different number of filter tabs may be used. For example, another two taps may be added in the horizontal direction to make it a 5-tap filter (4 difference inputs), with the same quantization levels above, the number of delta combinations may be $81(3^4)$.

FIG. 20 shows an example implementation of various 3-tap CCSO filter shapes according to an embodiment of the disclosure. The term CCSO filter shape is used to represent the number of taps for CCSO filtering and the positions of the taps. A number of filter shapes for a particular number of taps may be predefined as CCSO filter options. For example, in FIG. 20, for 3-tap CCSO filtering, any of the 6 different example filter shapes may be defined. Each of the filter shapes can define positions of the three reconstructed samples (also referred to as three taps) in a first component (also referred to as a first color component). The three reconstructed samples can include a center sample (denoted as c) and two symmetrically located samples, as denoted with same number (one of 1-6) in FIG. 20. In an example, a reconstructed sample in a second color component to be filtered is co-located with the center sample c. For purposes of clarity, the reconstructed sample in the second color component to be filtered is not shown in FIG. 20.

For CCSO filtering, as described above, each filter corresponds essentially to an LUT. The number of entries (rows) in the LUT is determined by the number of delta and quantization level combinations, as illustrated in Table 4 above. A CCSO filter may be associated with one or more CCSO filter or filtering parameters, including but not limited to filter shape, quantization step size (and quantization levels), and number of bands. The CCSO filter or filtering parameters may be alternatively referred to as CCSO parameters.

As described above, the differences or deltas between CCSO filtering taps relative to a center sample in a first color component are first processed using a quantizer. A quantizer may be characterized by at least a number of quantization intervals (or number of quantization levels) and one or more quantization step sizes. For an example quantizer with three quantization levels, a set of quantization intervals for sample deltas may be represented as: $(-\infty, -T1)$, $[-T1, T2]$, and $(T2, +\infty)$. Delta values falling within each of these quantization intervals may be quantized to a particular quantized delta level. For example, the three quantized delta levels corresponding to the three delta quantization intervals above may be given values of or represented by −1, 0, and 1. The quantization interval associated with zero quantization level value may be referred to a deadzone of the quantizer. In other words, the deadzone is a range of values assigned to be zero after applying quantization. The deadzone for the three-interval quantizer above with T1 and T2 being positive values, for example, is represented by $[-T1, T2]$.

An example three-level quantizer is shown above in Equations (18)-(20). The example quantizer in Equations (18)-(20) is shown as an example of a symmetric quantizer, where T1=T2=T in the general three-level quantization division above. In some example implementations, a quantizer may be asymmetric. For a general asymmetric three-level quantizer, T1 would not be equal to −T2.

While an asymmetric quantizer, with three-level or more, may be arbitrarily determined by the encoder and signaled in the bitstream (e.g., including all information for indicating or deriving each quantization interval), in some example implementations, it may be specified as derivable by applying a non-zero offset to a predefined or signaled symmetric quantizer. For example, for the three-interval symmetric quantizer above having quantization intervals of $(-\infty, -T)$, $[-T, T]$, $(T, +\infty)$, a corresponding three-level asymmetric quantizer may be obtained or achieved or derived by adding an offset F to the quantization intervals of the symmetric quantizer as $(-\infty, -T+F)$, $[-T+F, T+F]$, $(T+F, +\infty)$. This resulting quantizer is asymmetric since its quantization intervals are no longer symmetric with respect to zero sample delta.

In some example implementations, a plurality of symmetric and asymmetric quantizers may be predefined. In other words, each of the plurality of quantizers, being either symmetric or asymmetric, may be predefined with a set of quantization intervals and may be known to both an encoder and a decoder. These predefined quantizers may be indexed or may be associated with a quantizer identifiers so that each of them can be properly identified or referred to in an encoder or a decoder. In some example implementations, the symmetric quantizers and the asymmetric quantizers may be separately indexed as two distinct groups identified with differentiable group identifiers. In some alternative implementations, the symmetric quantizers and the asymmetric quantizers may be indexed or identified as a single group.

In some example implementations, the plurality of symmetric quantizers may be associated with various different numbers of quantization levels and/or quantization intervals. For example, the number of quantization levels (or quantization intervals) of a symmetric quantizer may be two, three, four or five. The quantization intervals excluding the two end intervals may be of equal quantization steps.

In some example implementations, an encoder may determine a selection from the plurality of symmetric quantizers and asymmetric quantizers for use and include the selection (e.g., an index associated with the selected quantizer) in the bitstream. The selection of the quantizer by the encoder may be made at coding levels including but not limited to a sequence level, a picture level, a slice level, a tile level, a superblock level, and a coding block level. The selection may thus be correspondingly signaled in one or more high-level syntaxes at one or more of a sequence header, a picture header, a slice header, a tile header, a superblock header, and a coding block header, and the like. If a single set of indexes of identifications are used for the symmetric and asymmetric quantizers (in other words, when the plurality of predefined quantizer include a mixed set of symmetric and asymmetric quantizers), then a single index or identification may be signaled in the bitstream to indicate the selection. If the symmetric and asymmetric quantizers are separately indexed, then the signaling for the selection may first indicate whether a symmetric quantizer or asymmetric quantizer is selected, and may then indicate the index of the selected symmetric or asymmetric quantizer. Alternatively, the indication that an asymmetric quantizer is selected may be first signaled and followed by the signaling of the index for the corresponding asymmetric quantizer.

In some example implementations, the asymmetric quantizers may correlate with the symmetric quantizers in the predefined plurality of quantizers. For example, as described above, a predefined asymmetric quantizer may relate to another predefined symmetric quantizer by a predefined offset.

For example, the set of predefined asymmetric quantizer and the predefined symmetric quantizers may possess a one-to-one correlation with predefined offsets. As such, the number of predefined symmetric quantizers may be equal to the number of predefined asymmetric quantizers, and a selection of by the encoder of using a particular symmetric quantizer may be signaled by an index among predefined indexes for the set of predefined symmetric quantizers. A selection of by the encoder of a particular asymmetric quantizer may be signaled by including in the bitstream the index for the corresponding symmetric quantizer among the predefined indexes for set of symmetric quantizers, followed by or preceded with an additional indication that an asymmetric rather than symmetric quantizer is selected. The decoder may then be able determine the proper selected predefined asymmetric quantizer (which is offset with respect to a corresponding symmetric quantizer of a predefined offset) to apply.

For another example, the set of predefined asymmetric quantizer may correlates with the predefined symmetric quantizer with predefined offsets, but may, however, not in a one-to-one correspondence. In other words, a number of predefined symmetric quantizers and a number of predefined asymmetric quantizers may not be equal. For example, one predefined symmetric quantizer may corresponds to one or more asymmetric quantizers by one or more corresponding predefined offsets. In some example implementations, there may N predefined offsets, and each predefined symmetric quantizer may correspond to N asymmetric quantizers. The predefined symmetric quantizers may be index for their selection and signaling by the encoder. The selection of the asymmetric quantizer by the encoder, for example, may be achieved by signaling the index for the corresponding symmetric quantizer, followed by or preceded additionally with a selection of the offset (which may be an index of offset of the N predefined offsets, or a direct signaling of the amount of offset).

In some other example implementations above, two or more predefined symmetric quantizers may correspond to different numbers of asymmetric quantizers. For example, a symmetric quantizer with a larger deadzone may correspond to a larger number of predefined asymmetric quantizers. As such, signaling of selection of an asymmetric quantizer may be made by indicting its corresponding symmetric quantizer and then using an index for selecting form its corresponding asymmetric quantizers. Such index may be signaled in a manner depending on the symmetric quantizer (as the number of bits for signaling the asymmetric quantizer selection may be different for different corresponding symmetric quantizers).

In some other example implementations above, not every predefined symmetric quantizer corresponds one or more asymmetric quantizers. In other words, some predefined symmetric quantizer may not correspond to any predefined asymmetric quantizer. As such, when such a symmetric quantizer is signaled in the bitstream, then that means the symmetric quantizer is selected and no other additional syntax would be included in the bitstream for additional selection of an asymmetric quantizer. In other words, asymmetric quantizer is only signaled for a subset of symmetric quantizers. In such a manner, signaling efficiency may be improved. For a specific example, a predefined symmetric quantizer may not correspond to any asymmetric quantizer when its deadzone is smaller than a predefined threshold value. In other words, one of more asymmetric quantizer corresponding to a symmetric quantizer may be predefined and could be additionally signaled only when the deadzone size of the symmetric quantizer is greater than the given threshold.

In some other example implementations above, where multiple symmetric and asymmetric quantizers are predefined and a selection among them is signaled at various levels in the bit stream and where an asymmetric quantizer is achieved by adding a nonzero offset value to a symmetric quantizer, one of more offset values used to derive the asymmetric quantizers may depend on the corresponding symmetric quantizer. For example, for a symmetric quantizer with a greater deadzone size, a greater offset value may be used to derive the asymmetric quantizer. In some other example implementations, the offset value used to derive the asymmetric quantizer may depends on the internal bit depth of the codec or the loop filtering process. For example, the deeper the bit depth, the larger the offset (e.g., symmetric quantizers with different dead zone sizes or other properties may correspond to asymmetric quantizers with different offsets).

In some example implementations, numbers of possible offsets relative predefined symmetric quantizer to form asymmetric quantizers may depend on the corresponding symmetric quantizers. For example, for a symmetric quantizer with a greater deadzone size, a larger number of possible offset values may be used to derive the asymmetric quantizer.

In some other example implementations above, the asymmetric quantizer may be derived on top of the selected symmetric quantizer. In some other example implementations, the selection of symmetric quantizer is signaled before the selection of asymmetric quantizer. In yet some other example implementations, the number of applicable offset values used to derive asymmetric quantizers is different for different symmetric quantizers that are used to derive the asymmetric quantizer.

In some example implementations, a plurality of symmetric quantizer may be predefined and known to encoders and decoders. Selection of symmetric quantizers among the plurality of quantizers for use at various coding levels may be determined by the encoder and signaled in the bitstream. For example, as described above, the plurality of symmetric quantizer may be indexed and index of a selected symmetric quantizer may be signaled. If an asymmetric quantizer is to be applied, an indicator may be signaled following or preceding the signaling of the symmetric quantizer, and an offset may be additional signaled. In some example implementations, a plurality of offsets may be predefined and an index may be signaled to indicate which offset to apply to the signaled symmetric quantizer. In some other example implementations, an actual offset may be signaled. In some example implementations, an offset may be predefined and thus only the indicator of whether asymmetric quantizer is to be applied is signaled without signaling of the offset. In some other implementations, a predefined derivation rule set may be provided such that an asymmetric quantizer may be derived from a signaled symmetric quantizer as selected by the encoder. The derivation rule set, for example, may be based on deadzone size or quantization interval size of the signaled symmetric quantizer. The predefined rule set, for example, may specify the offset as a function of deadzone size or quantization interval size of the symmetric quantizer.

In some example implementations, all available CCSO quantizers may be signaled in high-level syntax. For example, all allowed symmetric quantizers may be signaled, e.g., identification of allowed symmetric quantizers among a predefined set of quantizers may be signaled and indexed for selection in the bitstream. In addition, allowed offsets for each allowed symmetric quantizer may also be signaled and indexed for reference when an asymmetric quantizer is selected in the bitstream.

In the various implementations above, a CCSO filtering unit refers to a section of reconstructed video frame of any size that is subject to being processed by CCSO filters.

Figure 21:
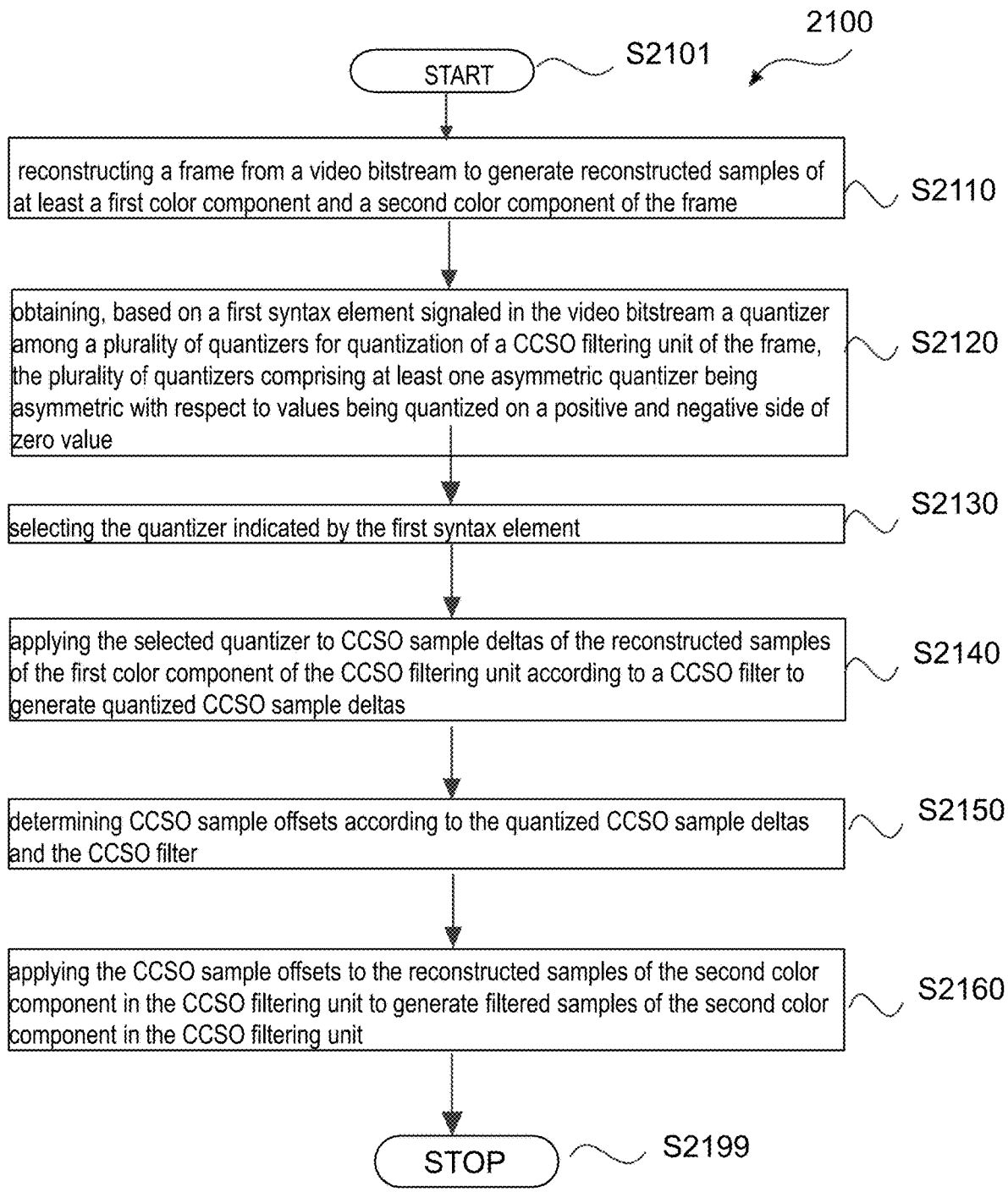
FIG. 21 shows a flow chart outlining a process (2100) according to an embodiment of the disclosure.

FIG. 21 shows a flow chart 2100. The logic flow 2100 start at S2101. At S2110, a frame from a video bitstream is reconstructed to generate reconstructed samples of at least a first color component and a second color component of the frame. In S2120, a quantizer is obtained based on a first syntax element signaled in the video bitstream among a plurality of quantizers for quantization of a CCSO filtering unit of the frame, the plurality of quantizers comprising at least one asymmetric CCSO quantizer being asymmetric with respect to values being quantized on a positive and negative side of zero value. At S2130, the quantizer is selected according to at least the first syntax element. In S2140, the selected CCSO quantizer is applied to CCSO sample deltas of the reconstructed samples of the first color component of the CCSO filtering unit according to a CCSO filter to generate quantized CCSO sample deltas. In S2150, CCSO sample offsets are determined according to the quantized CCSO sample deltas and the CCSO filter. In S2160, the CCSO sample offsets are applied to the reconstructed samples of the second color component in the CCSO filtering unit to generate filtered samples of the second color component in the CCSO filtering unit. The logic flow 2100 ends at S2199.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
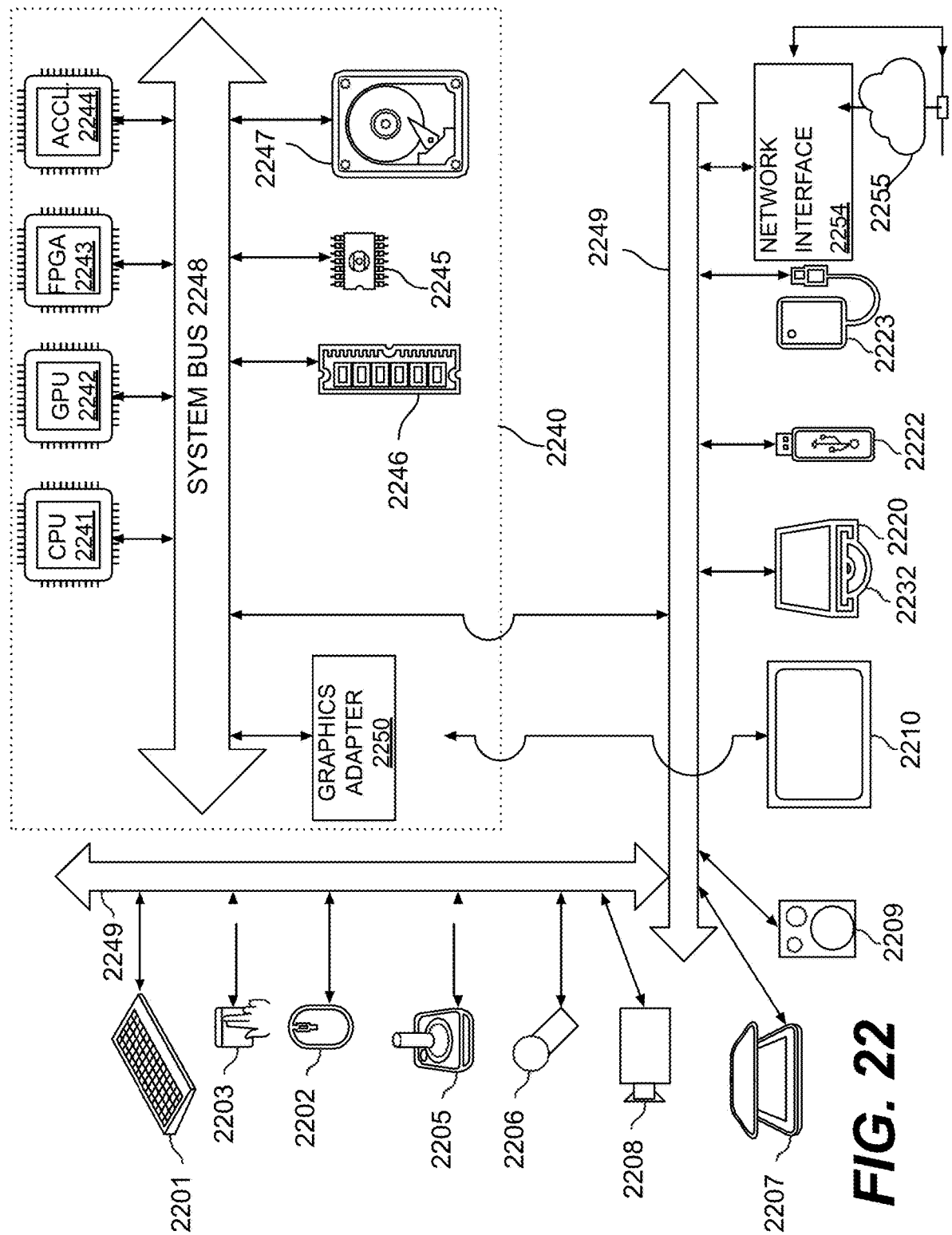
FIG. 22 shows a schematic illustration of a computer system in accordance with an example embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
    reconstructing a frame from a video bitstream to generate reconstructed samples of at least a first color component and a second color component of the frame;
    obtaining, based on a first syntax element signaled in the video bitstream a quantizer among a plurality of quantizers for quantization of a CCSO (Cross-Component Sample Offset) filtering unit of the frame, the plurality of quantizers comprising at least one asymmetric quantizer being asymmetric with respect to values being quantized on a positive and negative side of zero value;
    selecting the quantizer indicated by the first syntax element;
    applying the selected quantizer to CCSO sample deltas of the reconstructed samples of the first color component of the CCSO filtering unit according to a CCSO filter to generate quantized CCSO sample deltas;
    determining CCSO sample offsets according to the quantized CCSO sample deltas and the CCSO filter; and
    applying the CCSO sample offsets to the reconstructed samples of the second color component in the CCSO filtering unit to generate filtered samples of the second color component in the CCSO filtering unit.

2. The method of claim 1, wherein each of the plurality of quantizers is characterized by one or more quantization intervals.

3. The method of claim 2, wherein the at least one asymmetric quantizer each correspond to one of symmetric quantizers of the plurality of quantizers, by a CCSO (Cross-Component Sample Offset) sample delta offset, each of the symmetric quantizers being symmetric with respect to zero sample delta.

4. The method of claim 3, wherein the plurality of CCSO (Cross-Component Sample Offset) quantizers are predefined and indexed, and the selected CCSO quantizer is signaled in the video bitstream by the first syntax element.

5. The method of claim 3, wherein the plurality of quantizers comprises a subset of symmetric quantizers and a subset of asymmetric quantizers having a one-to-one correspondence relationship.

6. The method of claim 5, wherein the subset of symmetric CCSO (Cross-Component Sample Offset) quantizers and the subset of asymmetric CCSO quantizers are related by a predefined sample delta offset.

7. The method of claim 6, wherein a selection of an asymmetric quantizer is indicated in the video bitstream by a second syntax element for signaling an indication that an asymmetric quantizer is to be used and by the first syntax element indicating a symmetric quantizer among the subset of symmetric quantizers that correspond to the selected asymmetric CCSO quantizer.

8. The method of claim 7, wherein the first syntax element comprises an index for the symmetric quantizer corresponding to the selected asymmetric quantizer.

9. The method of claim 3, wherein the plurality of quantizers comprises a subset of symmetric quantizers and a subset of asymmetric quantifiers with unequal numbers.

10. The method of claim 9, wherein each of the subset of symmetric quantizers corresponds to zero or more asymmetric quantizers by one or more sample delta offsets among a predefined set of sample delta offsets.

11. The method of claim 10, wherein a selection of an asymmetric quantizer is indicated in the video bitstream by the first syntax element indicating a symmetric quantizer corresponding to the selected asymmetric quantizer and a second syntax element indicating an offset to apply the symmetric quantizer indicated by the first syntax element to generate the selected asymmetric quantizer.

12. The method of claim 10, wherein a selection of an asymmetric quantizer is indicated in the video bitstream by the first syntax element indicating a symmetric quantizer corresponding to the selected asymmetric quantizer and a second syntax element indicating an index among asymmetric quantizers corresponding to the symmetric quantizer indicated by the first syntax element.

13. The method of claim 10, wherein a number of asymmetric quantizers corresponding to a symmetric quantizer depends non-descendingly on a size of a quantization interval of the symmetric quantizer.

14. The method of claim 9, wherein at least one of the subset of symmetric quantizers corresponds to none of the subset of asymmetric quantizers.

15. The method of claim 9, wherein a symmetric quantizer among the subset of symmetric quantizers corresponds to none of the subset of asymmetric quantizers when its deadzone is at or smaller than a threshold value, a deadzone representing a quantization interval encompassing zero sample delta of a symmetric quantizer.

16. The method of claim 1, wherein the first syntax element is signaled at a sequence header, a picture header, a tile header, or a largest coding block header level.

17. The method of claim 1, wherein the first syntax element is used to select an asymmetric quantizer from the plurality of quantizers by indicating a symmetric quantizer, deriving a sample delta offset based on the indicated symmetric quantizer, and generating the selected asymmetric quantizer by applying the derived sample delta offset to the indicated symmetric quantizer.

18. The method of claim 17, wherein deriving the sample delta offset is based on a size of a deadzone of the indicated symmetric quantizer, the deadzone representing a quantization interval encompassing zero sample delta of the indicated symmetric quantizer.

19. The method of claim 1, wherein determining the selected quantizer according to the first syntax element comprises:
   determining from the first syntax element a selected symmetric quantizer;
   determining a size of a deadzone of the selected symmetric quantizer, the deadzone representing a quantization interval encompassing zero sample delta of the selected symmetric quantizer;
   in response to the size of the deadzone of the selected symmetric quantizer being smaller than a predefined threshold value, determining that the selected symmetric quantizer is to be applied; and
   in response to the size of the deadzone of the selected symmetric quantizer being no smaller than the predefined threshold value, determining whether an asymmetric quantizer is to be selected based on a second syntax element in the video bitstream.

20. A device for filtering of a video bitstream, comprising a memory for storing instructions and a processor for executing the instructions to:
   reconstruct a frame from the video bitstream to generate reconstructed samples of at least a first color component and a second color component of the frame;
   obtain, based on a first syntax element signaled in the video bitstream, a quantizer among a plurality of quantizers for quantization of a CCSO (Cross-Component Sample Offset) filtering unit of the frame, the plurality of quantizers comprising at least one asymmetric quantizer being asymmetric with respect to values being quantized on a positive and negative side of zero value;
   select the quantizer according to the first syntax element;
   apply the selected quantizer to CCSO sample deltas of the reconstructed samples of the first color component of the CCSO filtering unit according to a CCSO filter to generate quantized CCSO sample deltas;
   determine CCSO sample offsets according to the quantized CCSO sample deltas and the CCSO filter; and
   apply the CCSO sample offsets to the reconstructed samples of the second color component in the CCSO filtering unit to generate filtered samples of the second color component in the CCSO filtering unit.

* * * * *